United States Patent
Higashi et al.

(10) Patent No.: US 9,753,628 B2
(45) Date of Patent: Sep. 5, 2017

(54) PLAYBACK SYSTEM, RECORDING MEDIUM, AND PLAYBACK CONTROL METHOD

(71) Applicants: Haruomi Higashi, Kanagawa (JP); Tomohiro Suzuki, Tokyo (JP)

(72) Inventors: Haruomi Higashi, Kanagawa (JP); Tomohiro Suzuki, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 353 days.

(21) Appl. No.: 14/340,139

(22) Filed: Jul. 24, 2014

(65) Prior Publication Data
US 2015/0046811 A1 Feb. 12, 2015

(30) Foreign Application Priority Data
Aug. 8, 2013 (JP) ................. 2013-165359

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *G06F 3/04817* (2013.01);
(Continued)

(58) Field of Classification Search
CPC ...... G06F 17/30058; G06F 3/16; G06F 3/167; G06F 17/30846; H04N 21/47;
(Continued)

(56) References Cited

U.S. PATENT DOCUMENTS 5,864,868 A 1/1999 Contois
6,248,946 B1 6/2001 Dwek
(Continued)

FOREIGN PATENT DOCUMENTS

CN 1955908 A 5/2007
EP 1970909 A1 9/2008
(Continued)

OTHER PUBLICATIONS

Extended European Search Report dated Jan. 13, 2015 issued in corresponding European Application No. 14179177.2.
(Continued)

*Primary Examiner* — David Phantana Angkool
(74) *Attorney, Agent, or Firm* — Harness, Dickey & Pierce, PLC

(57) ABSTRACT

A playback system includes a display device and an information terminal adapted to communicate with the display device. The information terminal includes a processor and a recording medium storing instructions which when executed by the processor cause the processor to perform a process including displaying a first group of identification information items of content data stored in the information terminal in a first viewing area of a display screen, and displaying a second group of identification information items of the content data selected according to a selecting operation performed on the first group of identification information items displayed in the first viewing area in a second viewing area of the display screen at different times. The display device is adapted to play back the content data corresponding to the selected identification information items.

16 Claims, 29 Drawing Sheets

(51) Int. Cl.
*G06F 3/0482* (2013.01)
*G11B 27/10* (2006.01)
*G11B 27/34* (2006.01)
*G06F 3/0481* (2013.01)

(52) U.S. Cl.
CPC ........ *G06F 3/04842* (2013.01); *G11B 27/105* (2013.01); *G11B 27/34* (2013.01)

(58) Field of Classification Search
CPC .. H04N 5/4403; H04N 21/4622; H04N 5/343; H04N 21/47217; H04N 21/482; H04N 21/485; H04N 21/436; H04N 21/64707; H04N 21/42676; H04N 21/6118; H04N 21/6168; H04N 21/236; H04N 21/4725; H04N 21/858; H04N 21/8583; H04N 21/8586; G11B 27/022; G11B 27/10; G11B 27/031; G11B 27/06; G11B 27/036; G06K 9/00765; G06T 13/80
See application file for complete search history.

(56) References Cited

U.S. PATENT DOCUMENTS

| | | | |
|---|---|---|---|
| 7,130,251 B1 | 10/2006 | Morohashi | |
| 7,283,429 B2 | 10/2007 | Suzuki | |
| 8,839,141 B2* | 9/2014 | Askey | G06Q 30/02 715/727 |
| 9,218,118 B2* | 12/2015 | Bachman | G06F 3/0486 |
| 9,247,363 B2* | 1/2016 | Triplett | H04L 12/28 |
| 9,363,355 B2* | 6/2016 | Ryu | H04M 1/7253 |
| 9,380,095 B2* | 6/2016 | Kuang | H04L 65/1083 |
| 9,495,076 B2* | 11/2016 | Kumar | H04L 12/6418 |
| 9,501,533 B2* | 11/2016 | Coburn, IV | G06F 17/3053 |
| 9,529,510 B2* | 12/2016 | Sutton | G06F 3/04842 |
| 2001/0018858 A1 | 9/2001 | Dwek | |
| 2002/0089529 A1 | 7/2002 | Robbin | |
| 2003/0101230 A1* | 5/2003 | Benschoter | G06F 17/30029 709/217 |
| 2004/0027931 A1 | 2/2004 | Morita | |
| 2004/0223245 A1 | 11/2004 | Morohashi | |
| 2005/0002283 A1* | 1/2005 | Suzuki | G11B 27/034 369/30.08 |
| 2005/0076307 A1 | 4/2005 | Robbin | |
| 2005/0141367 A1 | 6/2005 | Morohashi | |
| 2005/0146995 A1 | 7/2005 | Morita | |
| 2006/0212564 A1 | 9/2006 | Morohashi | |
| 2007/0094611 A1 | 4/2007 | Sasaki | |
| 2008/0008056 A1 | 1/2008 | Suzuki | |
| 2008/0154408 A1 | 6/2008 | Morohashi | |
| 2010/0135133 A1 | 6/2010 | Morohashi | |
| 2010/0281140 A1 | 11/2010 | Morohashi | |
| 2010/0281141 A1 | 11/2010 | Morohashi | |
| 2011/0202630 A1 | 8/2011 | Morohashi | |
| 2012/0050012 A1* | 3/2012 | Alsina | H04N 21/4126 340/10.1 |
| 2012/0059497 A1 | 3/2012 | Morohashi | |
| 2013/0047190 A1 | 2/2013 | Suzuki et al. | |
| 2013/0314427 A1 | 11/2013 | Suzuki et al. | |
| 2014/0059119 A1 | 2/2014 | Morohashi | |
| 2014/0214926 A1 | 7/2014 | Morohashi | |
| 2014/0215095 A1 | 7/2014 | Morohashi | |

FOREIGN PATENT DOCUMENTS

| | | |
|---|---|---|
| EP | 2249260 A2 | 11/2010 |
| EP | 2560361 A2 | 2/2013 |
| JP | 2005-027159 | 1/2005 |
| JP | 2006-286177 A | 10/2006 |
| JP | 2010-015501 | 1/2010 |
| JP | 2011-126134 | 6/2011 |

OTHER PUBLICATIONS

Chinese Office Action dated Sep. 30, 2016 issued in corresponding Chinese Application No. 201410557572.X (with translation).
Office Action dated Apr. 25, 2017 for Japanese patent application JP 2013-165359.

* cited by examiner

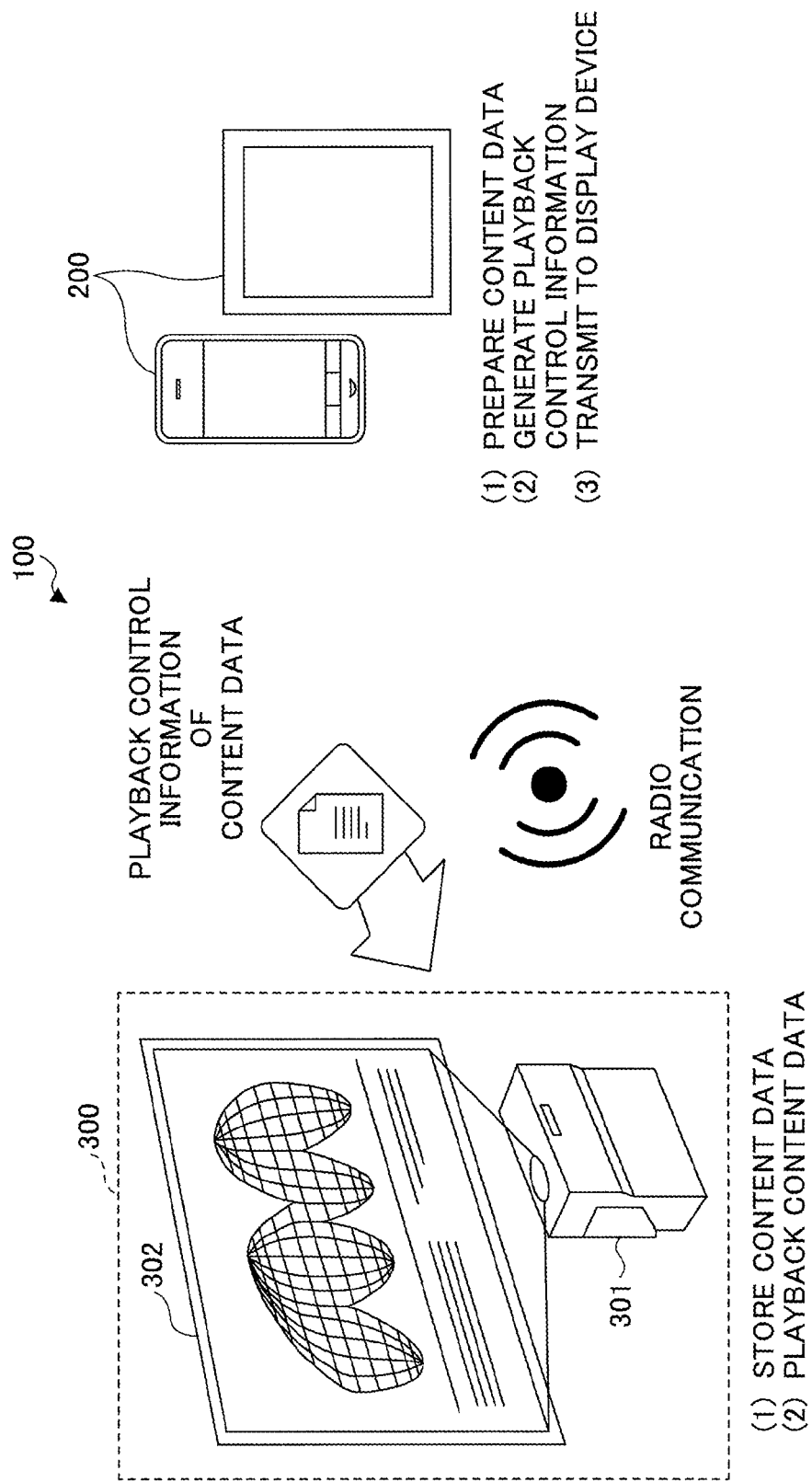

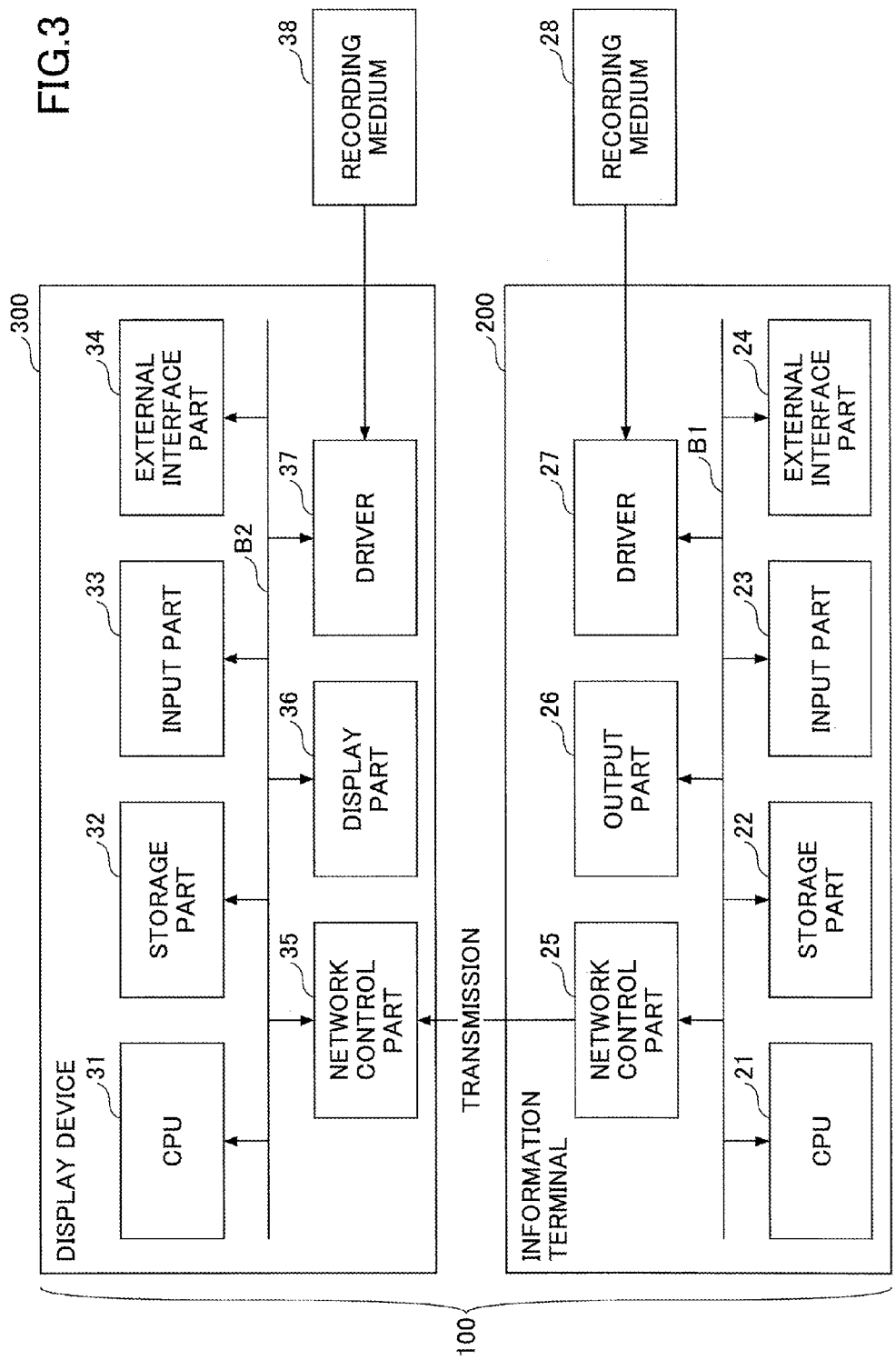

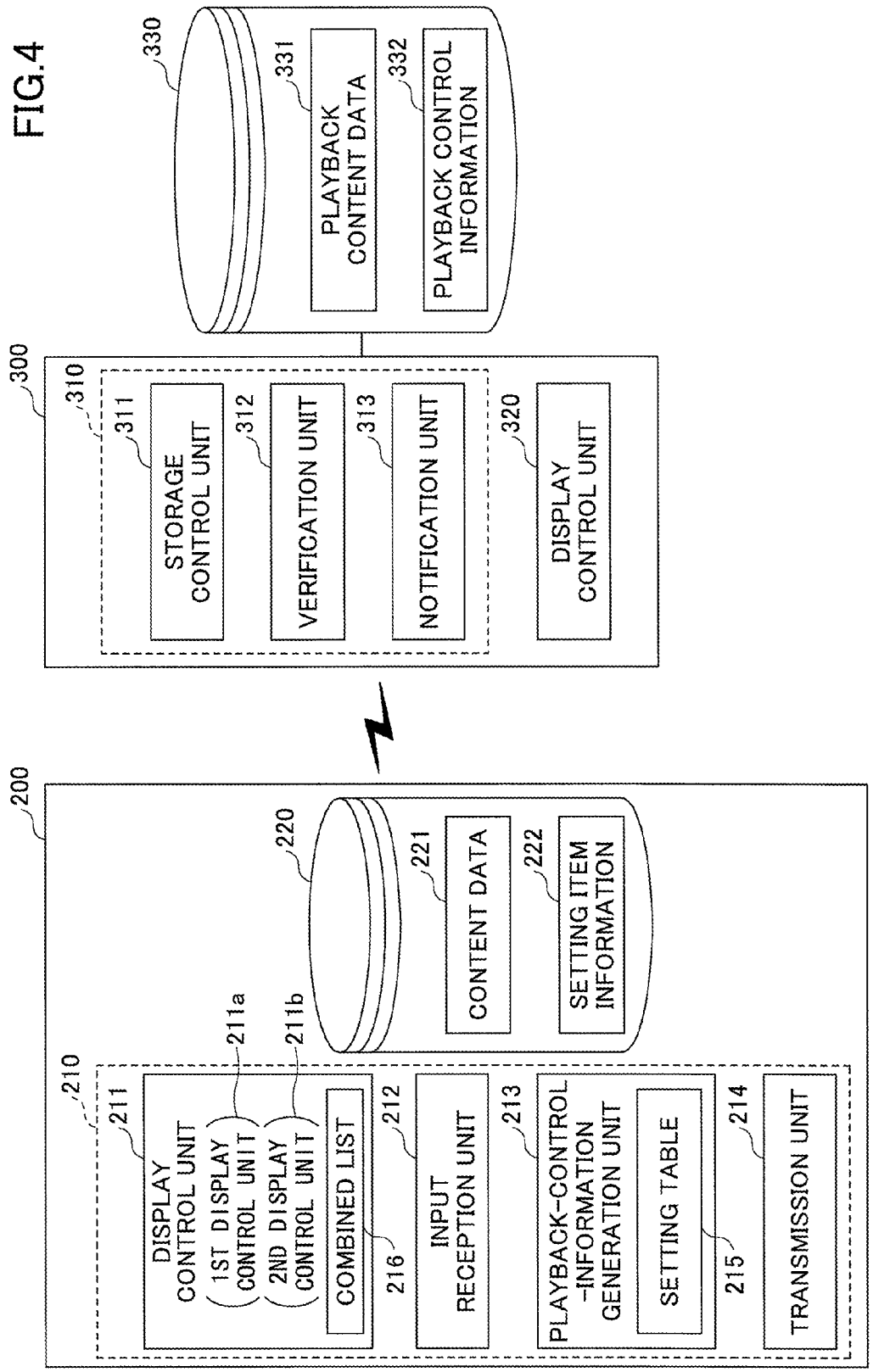

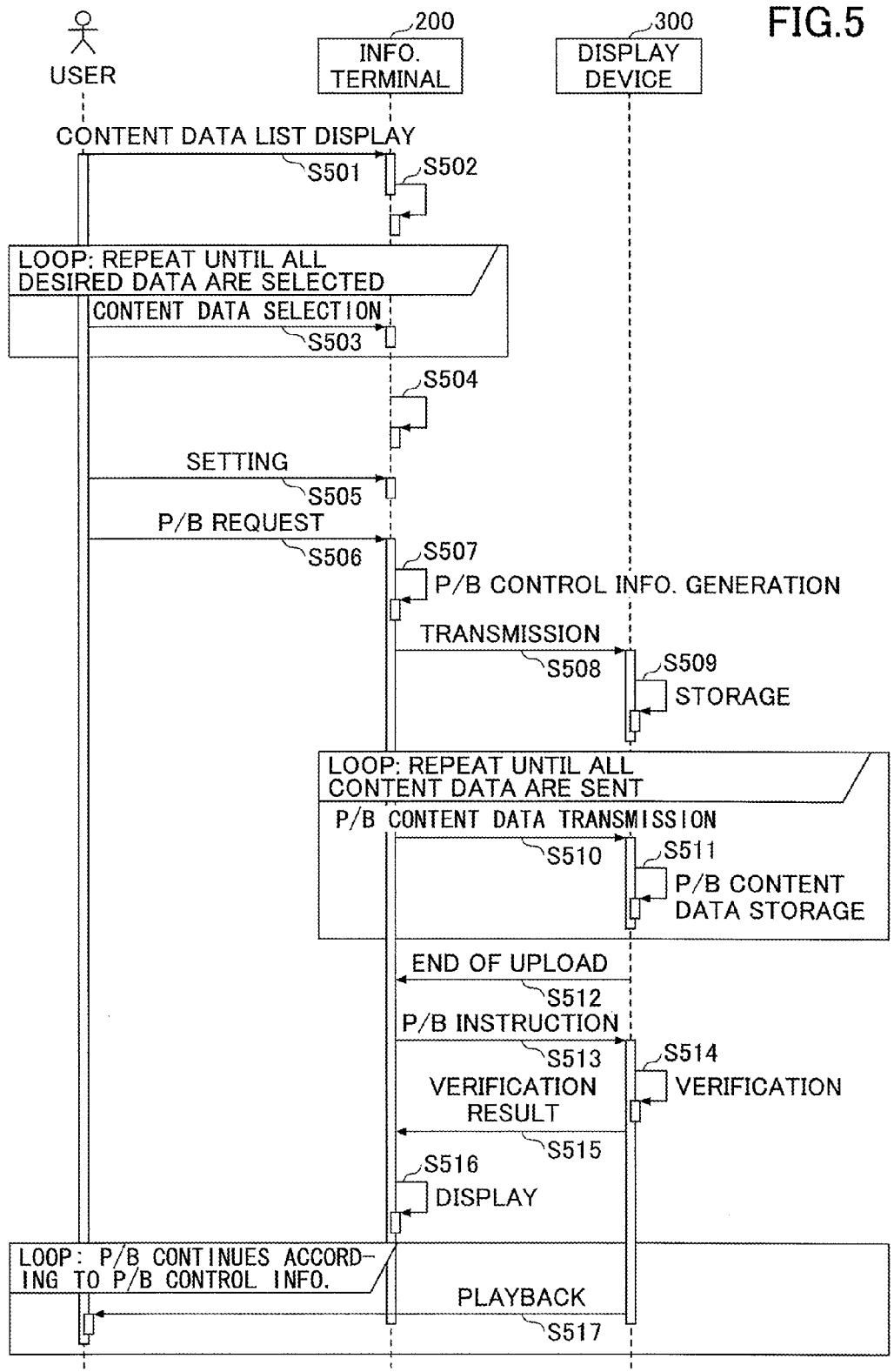

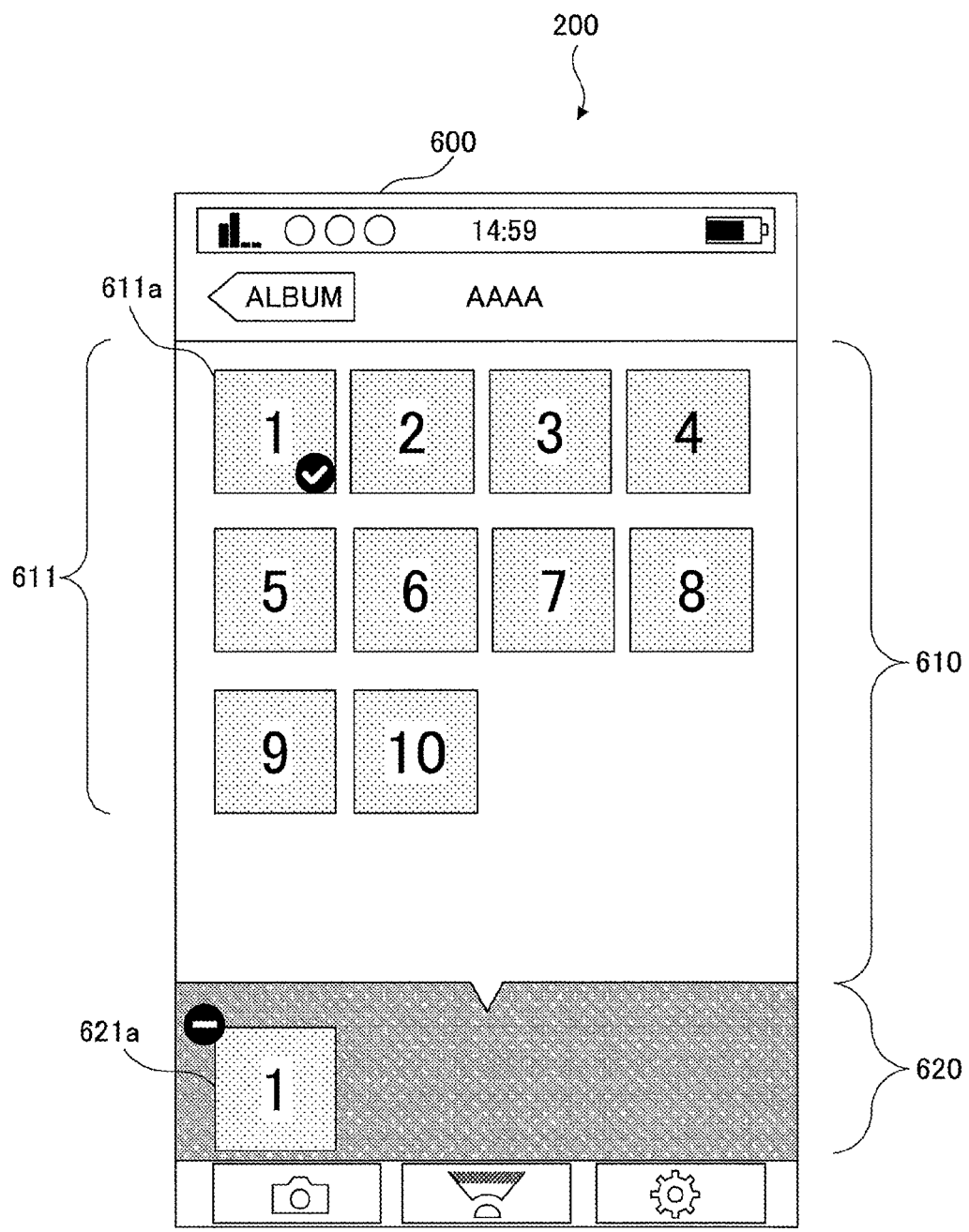

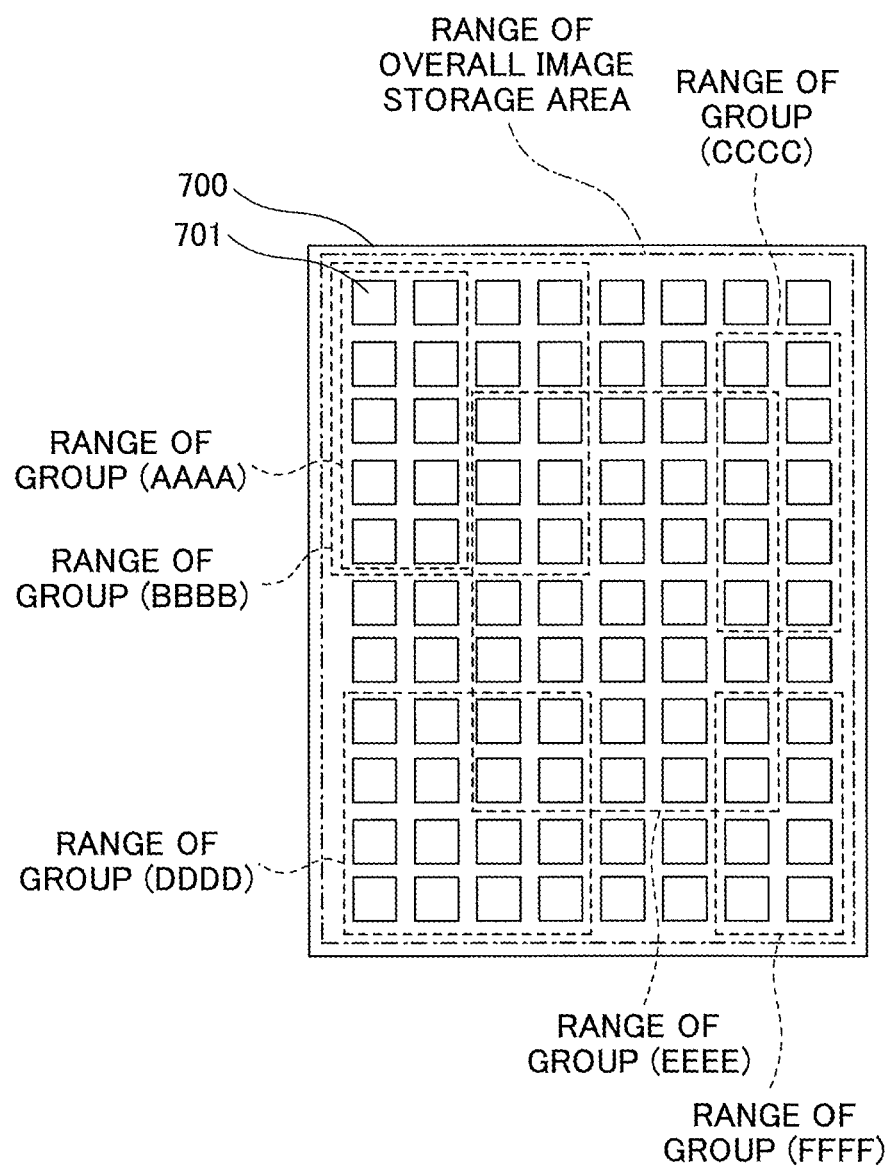

RANGE OF GROUP (EEEE)

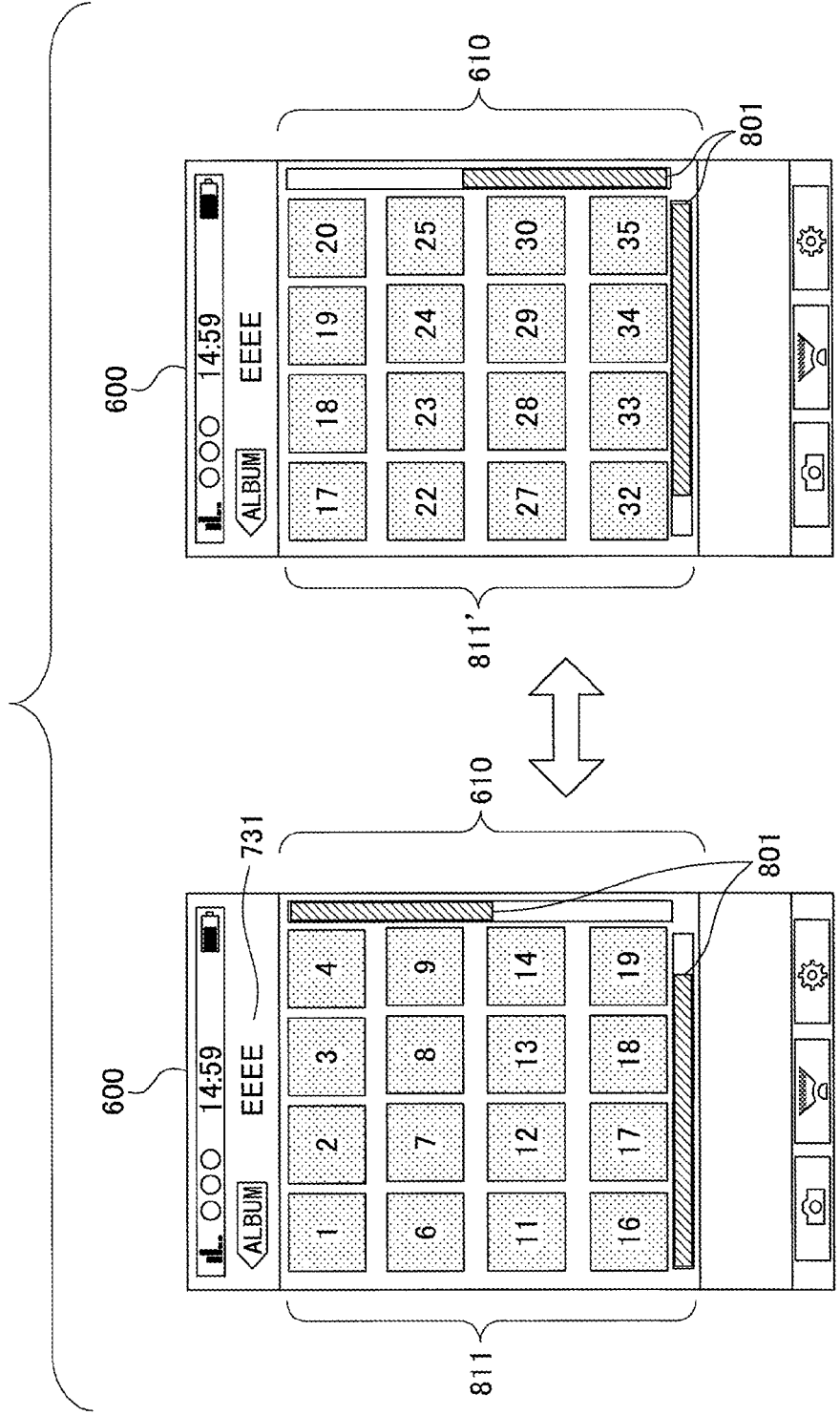

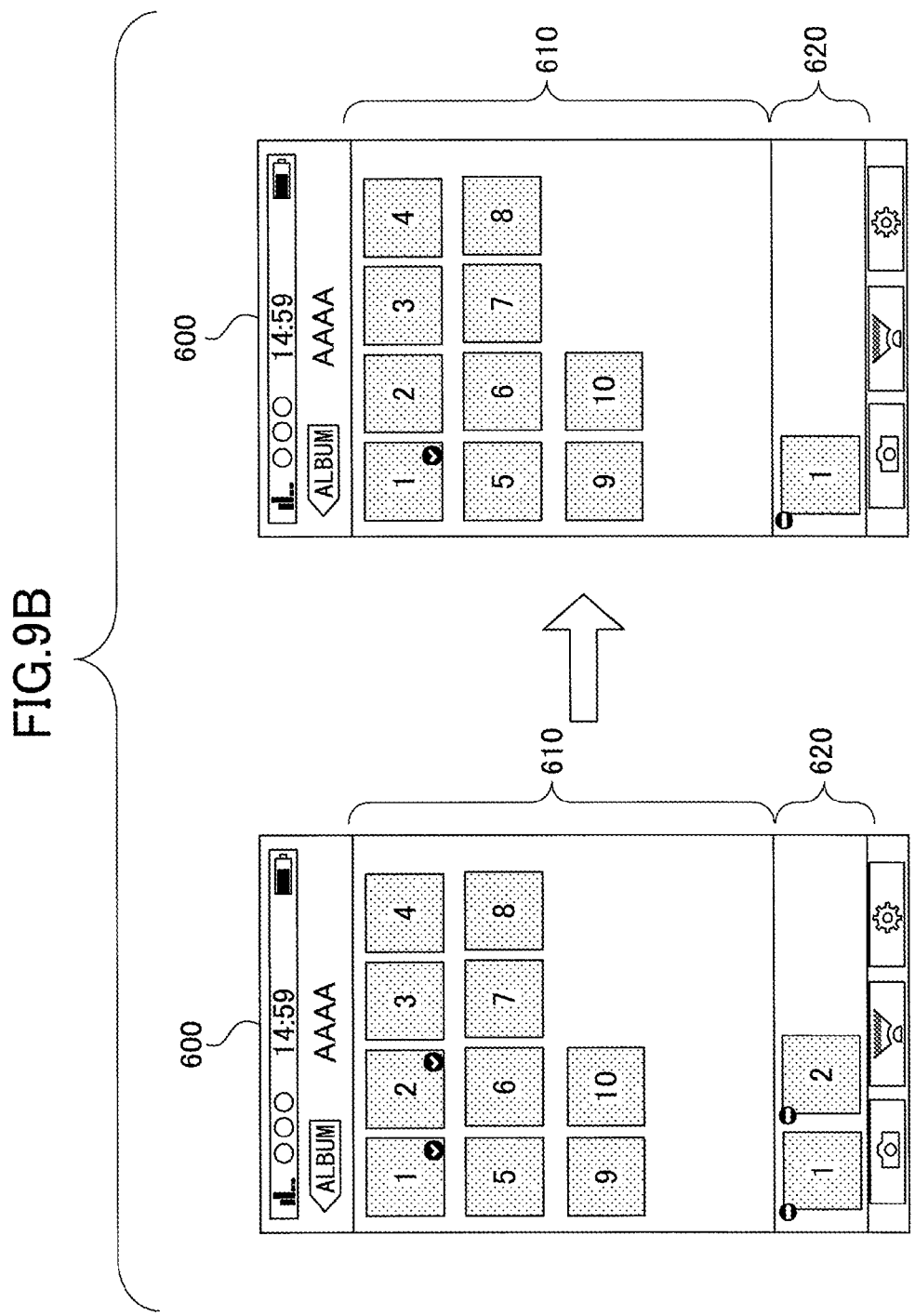

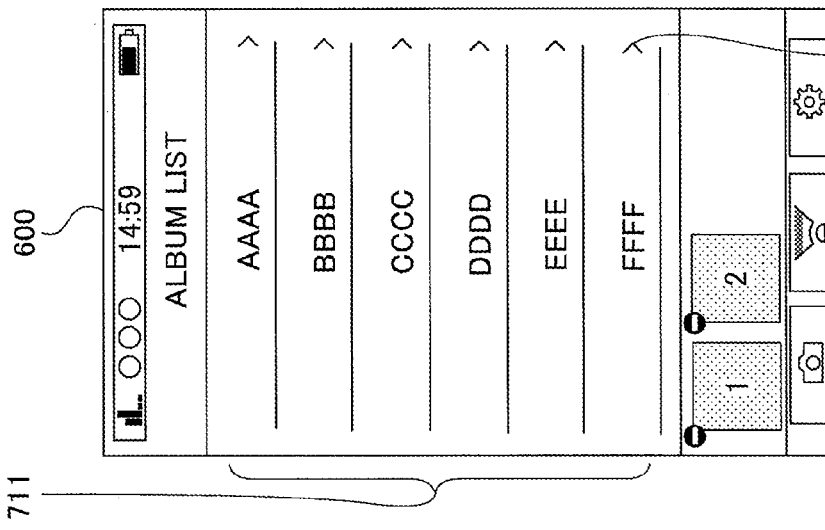
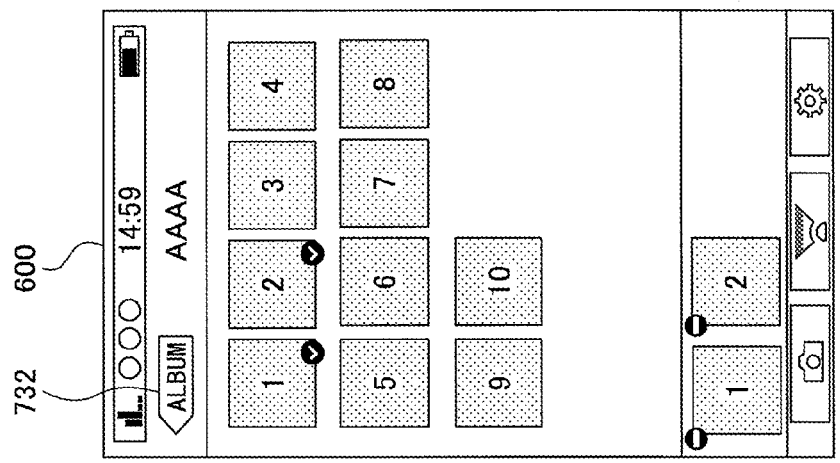
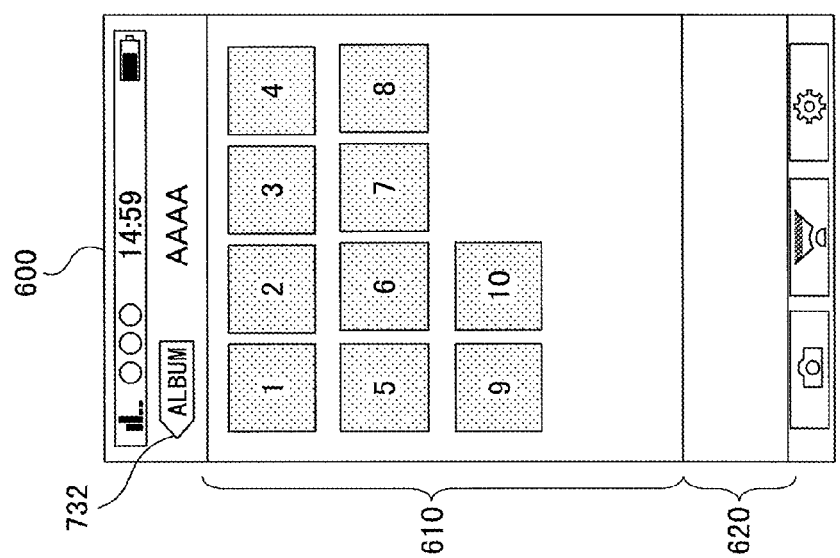

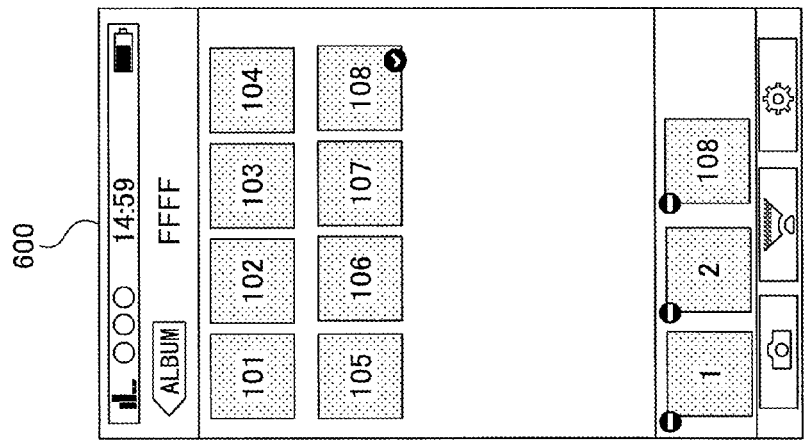
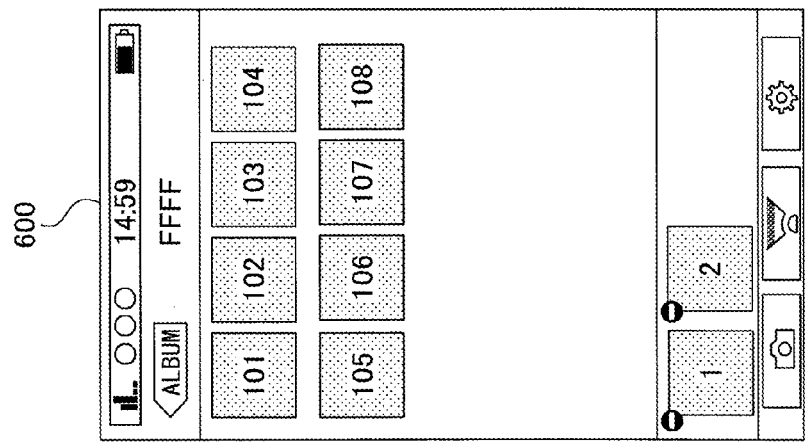

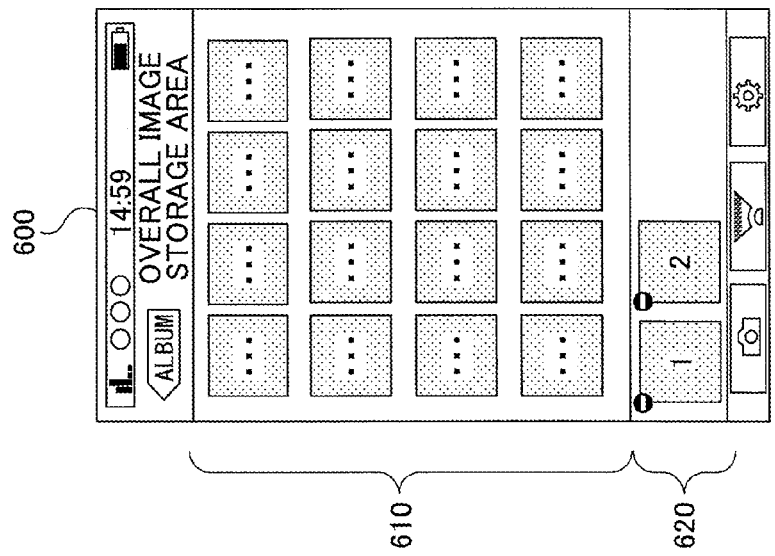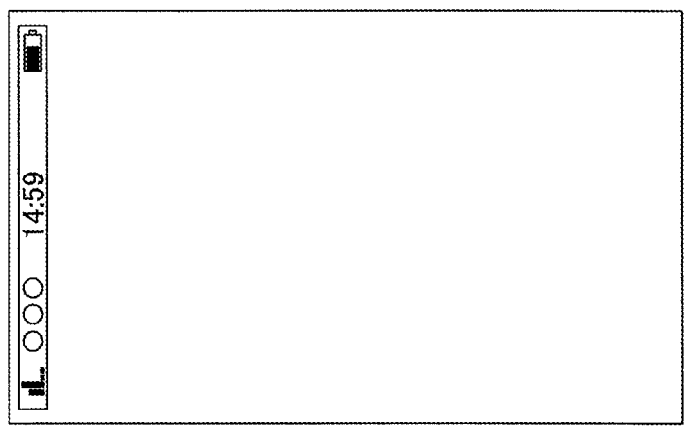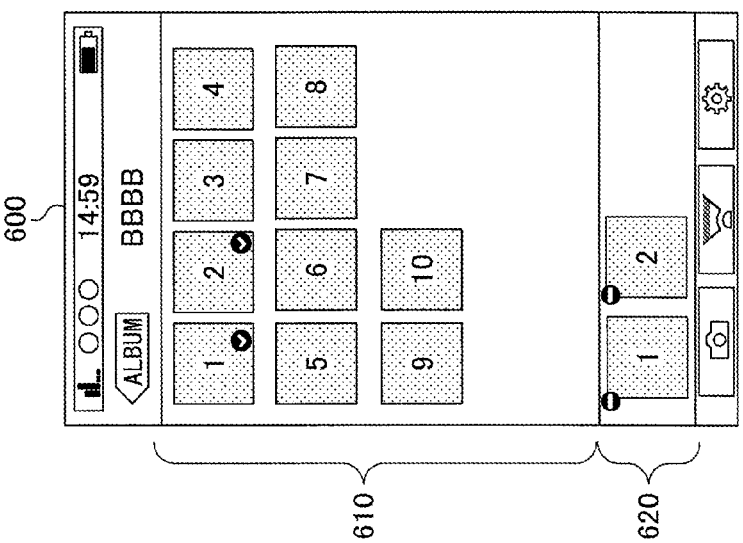

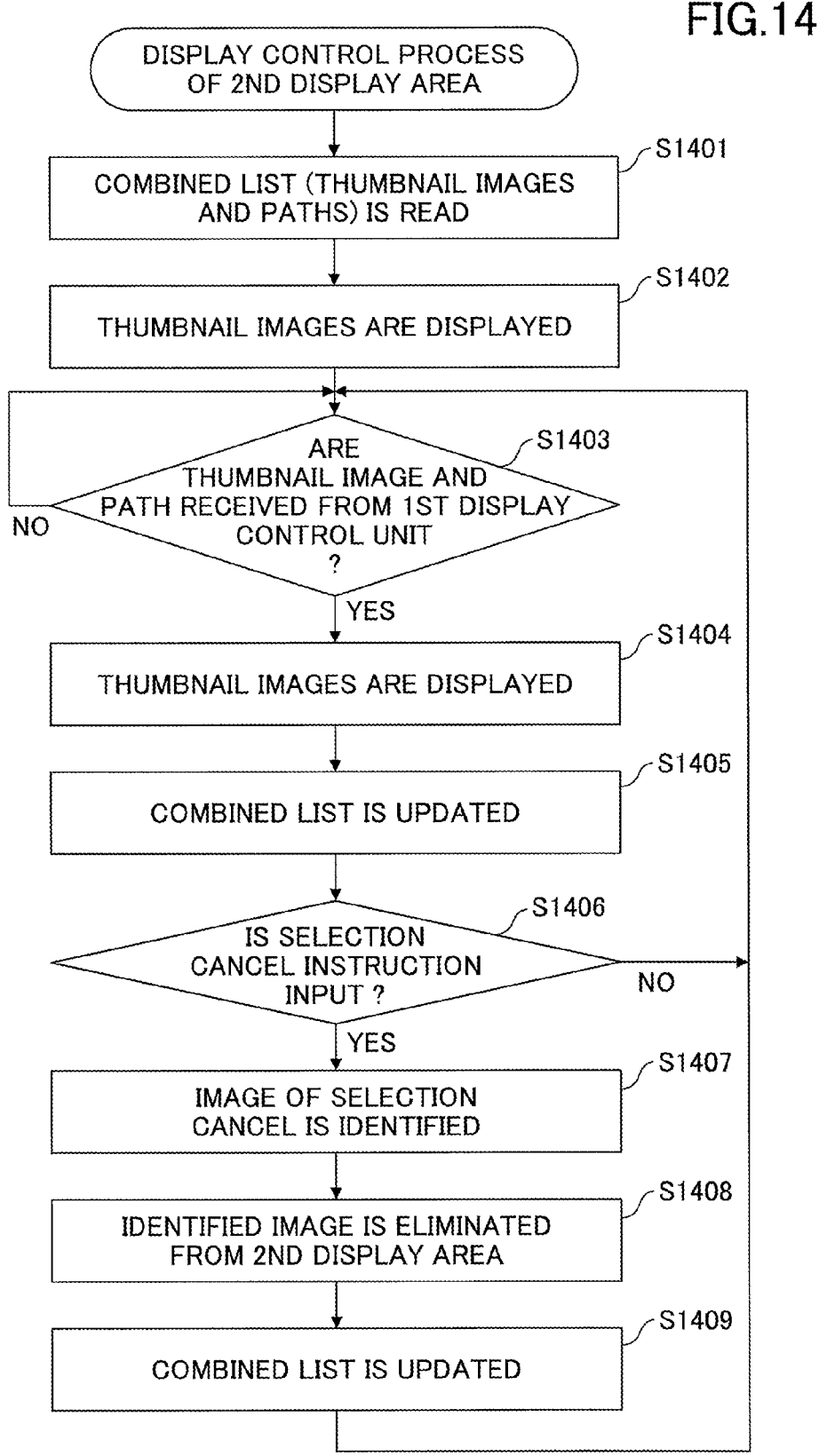

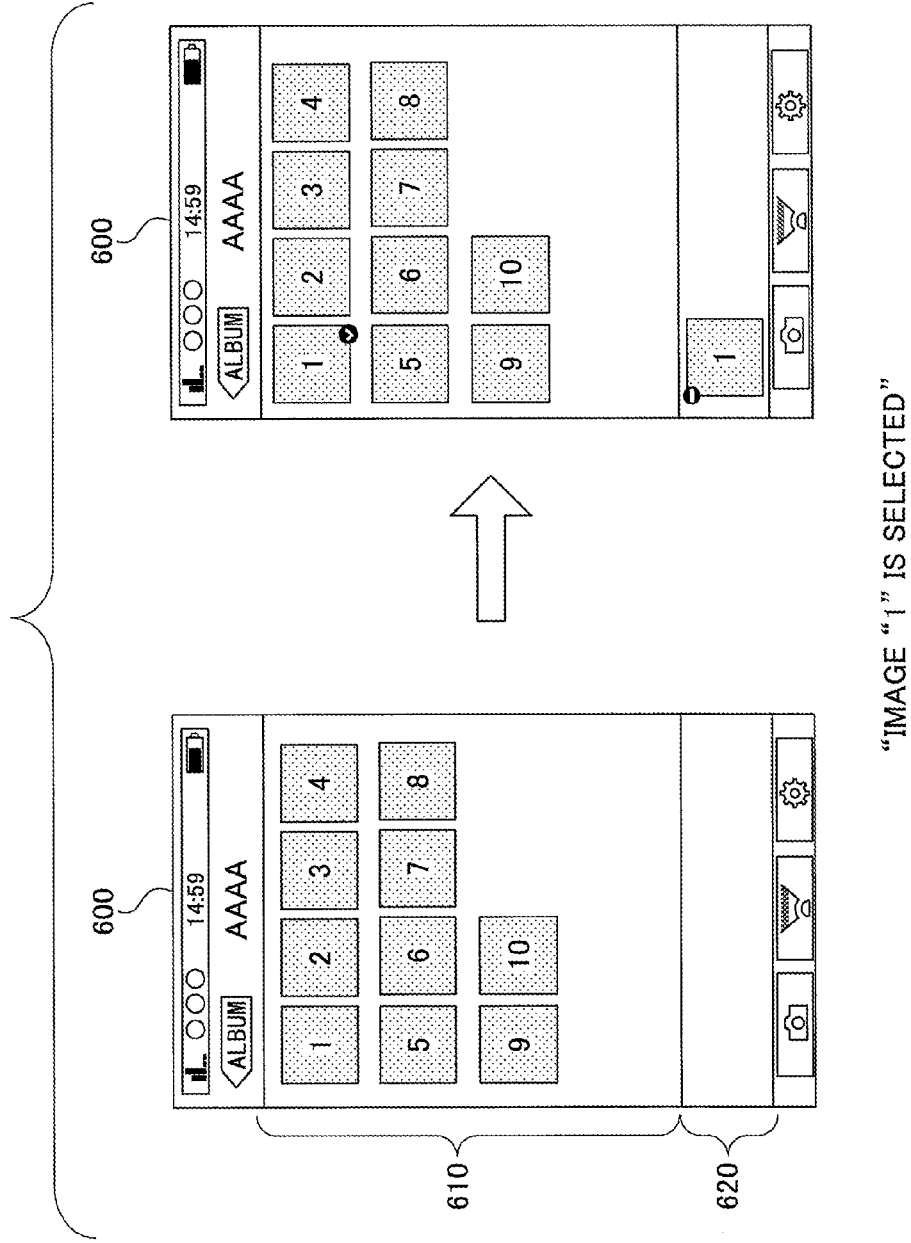

"SELECTION OF IMAGE "2" IS CANCELED"

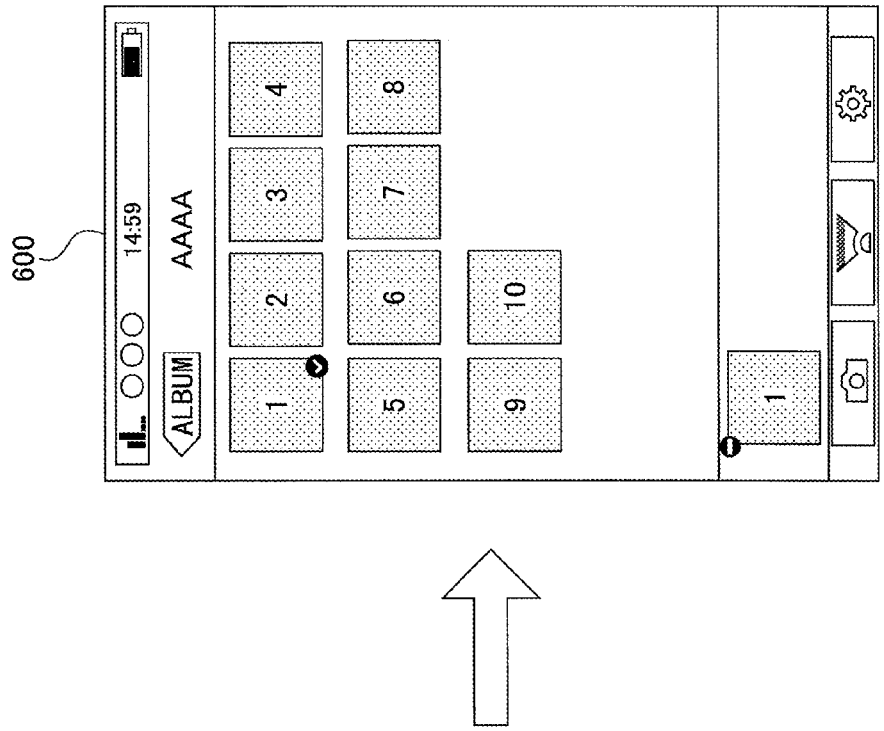
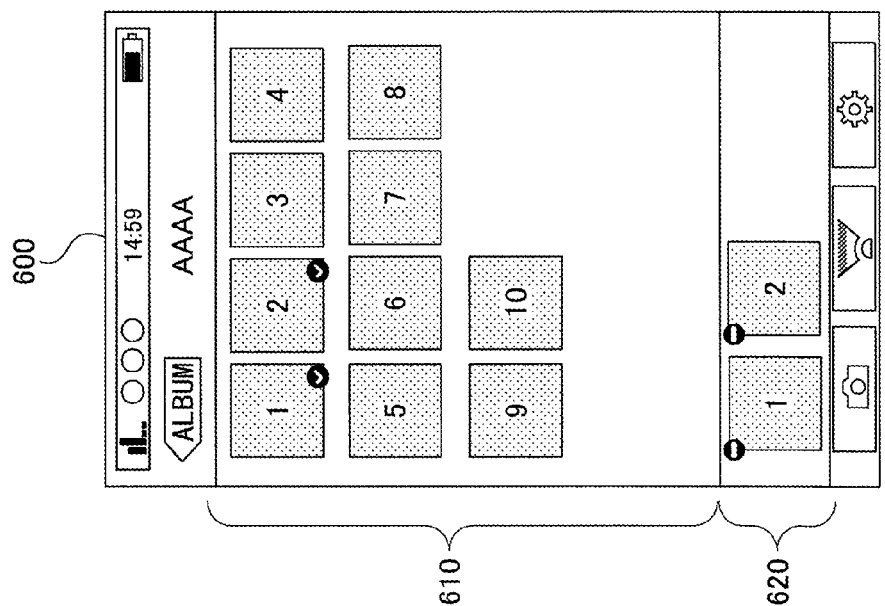

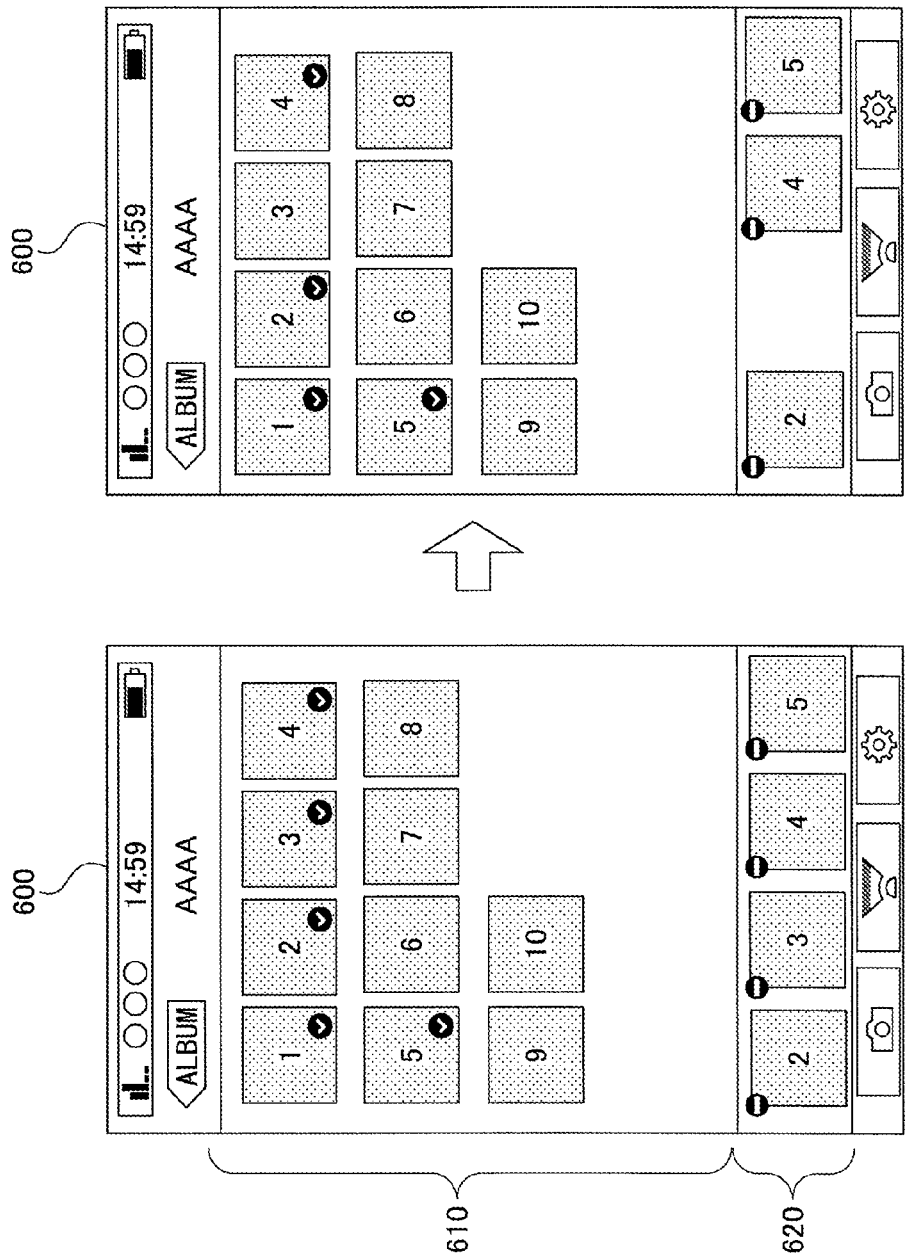

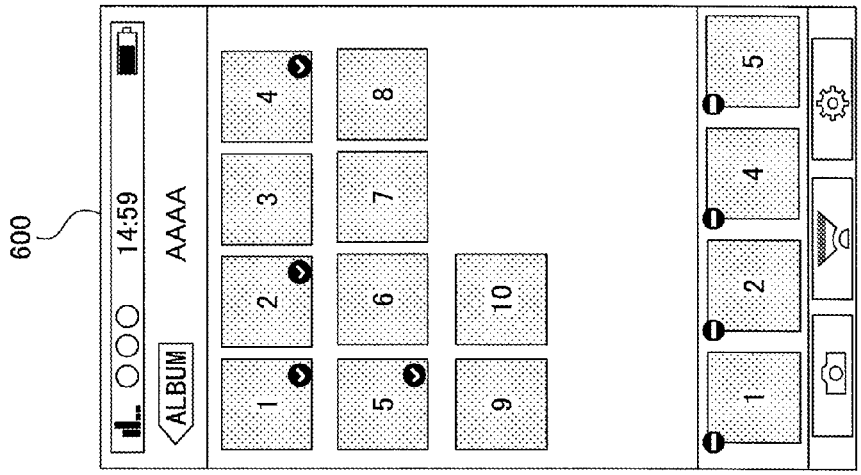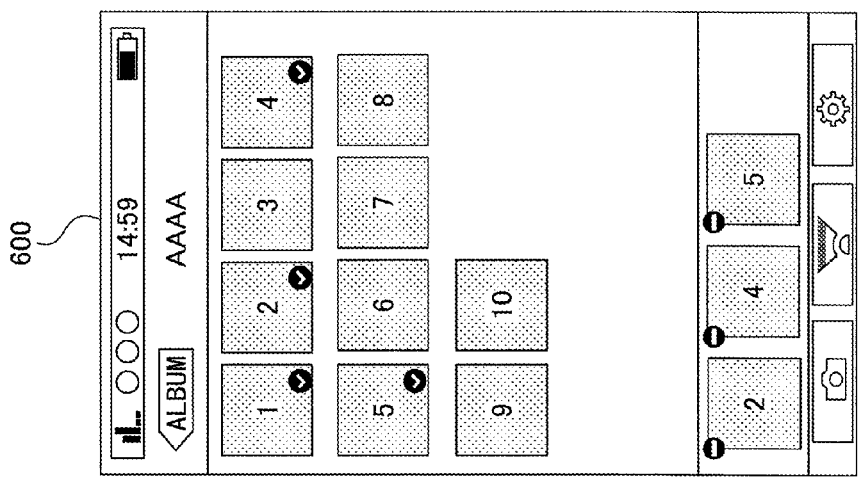

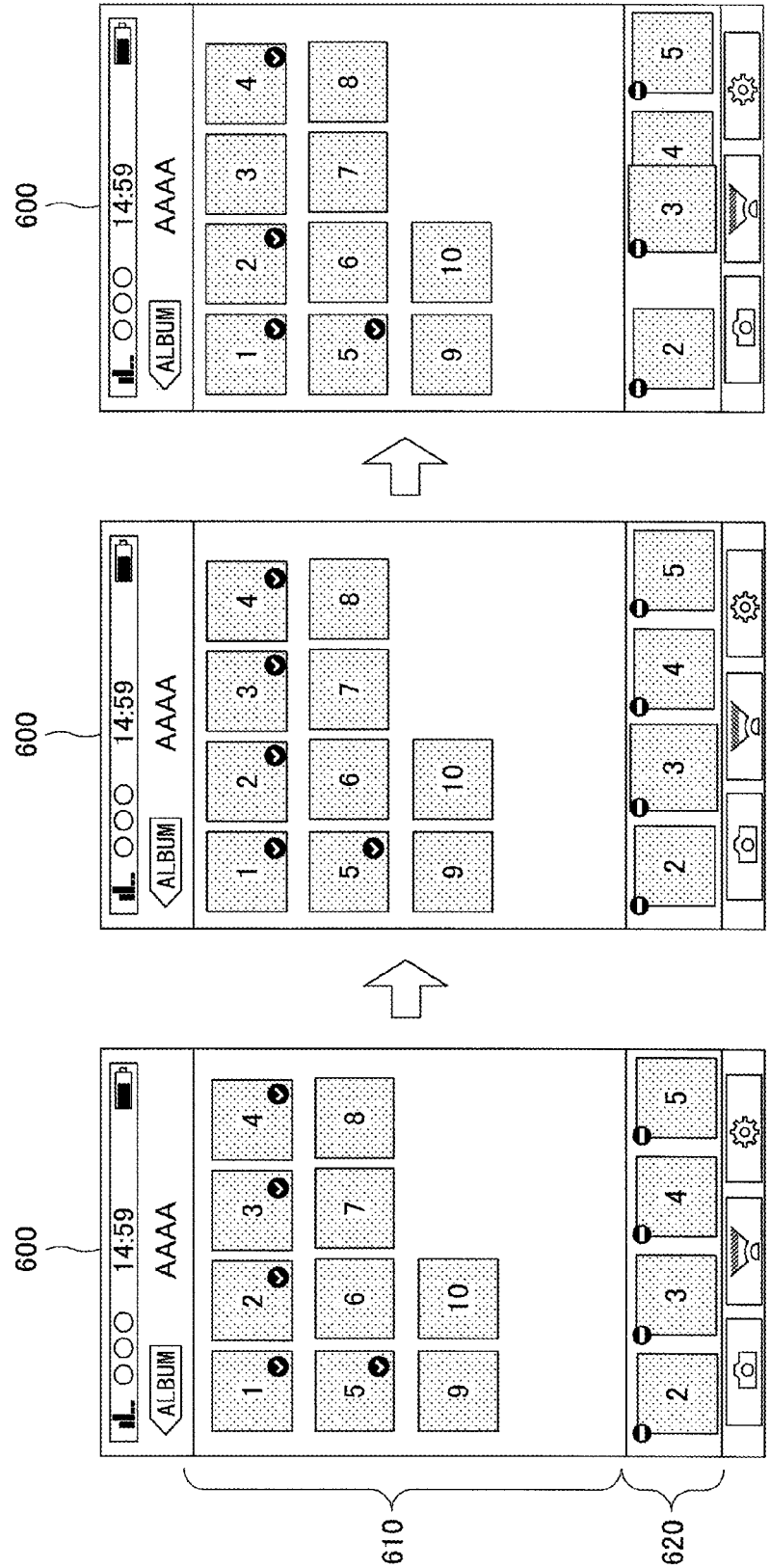

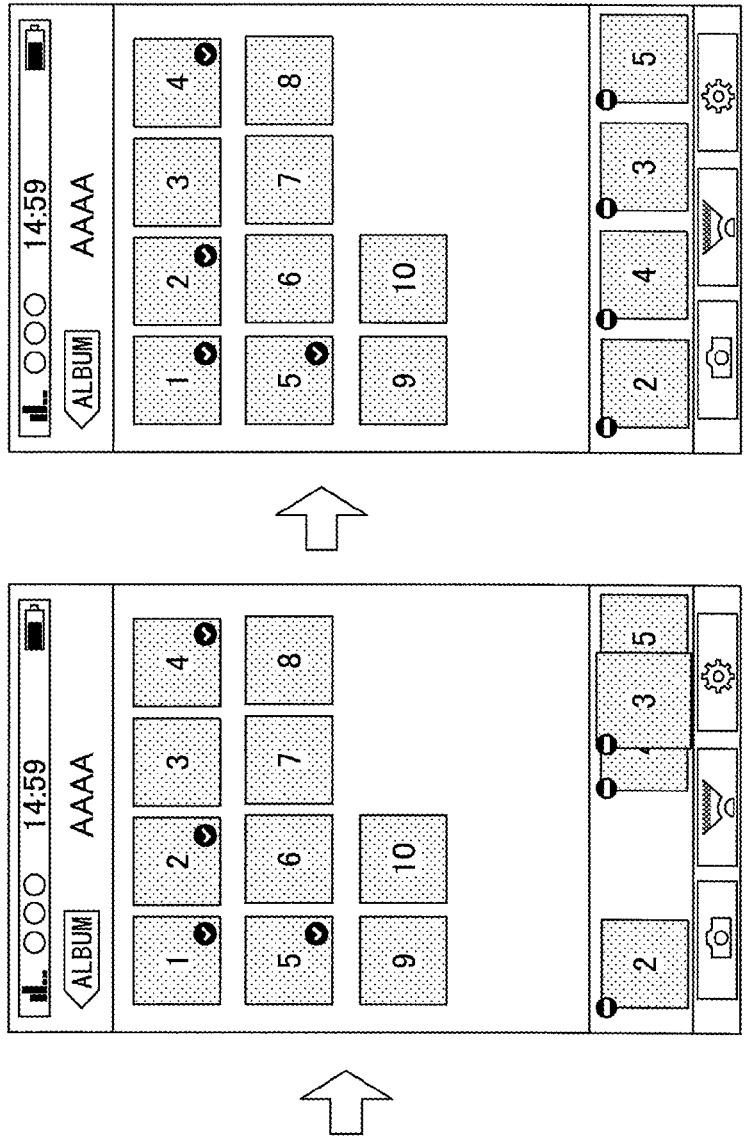

PLAYBACK SYSTEM, RECORDING MEDIUM, AND PLAYBACK CONTROL METHOD

BACKGROUND OF THE INVENTION

1. Field of the Invention

The present specification generally relates to the field of playback control. More particularly, the present specification relates to a playback system, a recording medium, and a playback control method.

2. Description of the Related Art

Conventionally, a playback control method for playing back content data, such as image data, using a play list file which identifies a sequence of playback of the content data is known. For example, see Japanese Laid-Open Patent Publication No. 2005-027159.

In the method according to Japanese Laid-Open Patent Publication No. 2005-027159, the content data may be played back in an arbitrary sequence only by rewriting the content of the play list file without editing the content data.

However, in the conventional method described above, a selection screen for selecting the content data to be played back and a display screen for displaying the result of the selection (or a screen for displaying the content of the play list file) are displayed as separate screens. Hence, it is difficult to check the content of the play list file while performing a selecting operation to select the content data, and the conventional method does not provide sufficient usability.

Specifically, if a user wants to select the content data after checking the content of the play list file, the user has to carry out two or more operating procedures in order to return to the selection screen. Moreover, if the user wants to check the content of the play list file in the middle of performing the selecting operation on the selection screen, the user has to carry out two or more operations in order to shift to the display screen.

On the other hand, when generating a file which identifies a group of content data as a playback object, such as a play list file, it is desirable that the user is able to perform the selecting operation to select the content data to be played back while confirming the selection result.

SUMMARY OF THE INVENTION

In one aspect, the present invention provides a playback system which is adapted to improve usability when performing a selecting operation to select a group of content data items as a playback object.

In an embodiment which solves or reduces one or more of the above-described problems, the present invention provides a playback system including a display device and an information terminal adapted to communicate with the display device, the information terminal including a processor and a recording medium storing instructions which when executed by the processor cause the processor to perform a display control process including displaying a first group of identification information items of content data stored in the information terminal in a first viewing area of a display screen and displaying a second group of identification information items of the content data selected according to a selecting operation performed on the first group of identification information items displayed in the first viewing area in a second viewing area of the display screen at different times; and the display device being adapted to play back the content data corresponding to the selected identification information items.

Other objects, features and advantages of the present invention will become more apparent from the following detailed description when read in conjunction with the accompanying drawings.

BRIEF DESCRIPTION OF THE DRAWINGS

FIG. 2 is a diagram for explaining a scenario in which the playback system according to the embodiment is utilized.

FIG. 3 is a diagram showing a hardware configuration of each of an information terminal and a display device of the playback system.

FIG. 4 is a diagram showing a functional configuration of each of the information terminal and the display device of the playback system.

FIG. 5 is a sequence diagram for explaining operation of the playback system.

FIG. 6 is a diagram showing an example of a display screen displayed on the information terminal.

FIGS. 7A and 7B are diagrams for explaining a relationship between a storage area and display information of a first viewing area of the display screen.

FIGS. 8A and 8B are diagrams for explaining a relationship between a scrolling function and display information of the first viewing area of the display screen.

FIGS. 9A and 9B are diagrams for explaining a selecting operation for selecting content data and a selection cancelling operation for cancelling selection of content data.

FIGS. 10A to 10E are diagrams for explaining a relationship between display information of the first viewing area and display information of a second viewing area.

FIGS. 12A to 12C are diagrams for explaining a relationship between start and end operations of a playback control program and display information of the second viewing area.

FIG. 14 is a flowchart for explaining a display control process of the second viewing area performed by a second display control unit of the playback control program.

FIGS. 15A and 15B are diagrams for explaining selection of content data and cancellation of selection of content data by voice input.

FIGS. 18A and 18B are diagrams for explaining a selecting operation for selecting content data and a selection cancelling operation for cancelling selection of content data.

FIGS. 20A to 20D are diagrams for explaining a selection cancelling operation for cancelling selection of content data.

FIGS. 21A to 21E are diagrams for explaining a change operation for changing a sequence of playback of playback content data.

DETAILED DESCRIPTION OF THE PREFERRED EMBODIMENTS

A description will be assigned of embodiments with reference to the accompanying drawings.

In the following embodiments, playback control is carried out by a playback system including an information terminal and a display device. Specifically, the playback control is carried out by the playback system in which the information terminal generates playback control information which is information associated with playback of content data based on values of setting items input by a user, and transmits the generated playback control information to the display device so that the playback control information is set to the display device. In the following, a description of the playback system will be assigned, and then a description of the playback control according to each embodiment carried out by the playback system will be assigned.

First Embodiment

Figure 1:
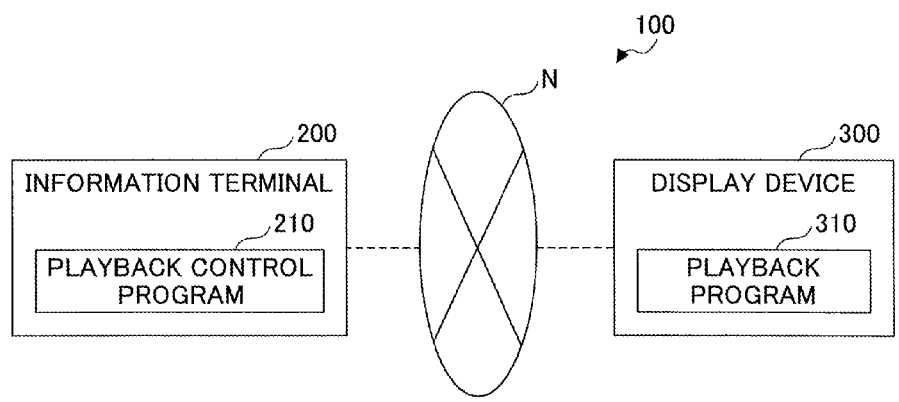
FIG. 1 is a diagram showing an overall configuration of a playback system according to one embodiment.

FIG. 1 shows an overall configuration of a playback system 100 according to a first embodiment. The playback system 100 includes an information terminal 200 and a display device 300. In the playback system 100, the information terminal 200 and the display device 300 are connected via a data transmission path N such as a network, so that the information terminal 200 and the display device 300 communicate with each other.

The information terminal 200 may perform communication according to a communication protocol complying with the communication standard such as 3G (3rd Generation), LTE (Long Term Evolution) or 4G (4th Generation). Moreover, the information terminal 200 may perform communication according to another communication protocol such as ZigBee or Bluetooth®.

The information terminals 200 may be implemented by a wireless communication terminal such as a smart phone or a mobile phone. Moreover, the information terminals 200 may be implemented by a tablet PC (personal computer) or a notebook PC. The information terminal 200 may be configured to communicate with the display device 300.

A playback control program 210 is installed in the information terminal 200. The playback control program 210 when executed by a processor of the information terminal 200 causes the processor to generate playback control information which is information associated with playback of the content data to be displayed on the display device 300, and transmit the content data and the playback control information to the display device 300.

A playback program 310 is installed in the display device 300. The playback program 310 when executed by a processor of the display device 300 causes the processor to display the content data received from the information terminal 200 based on the playback control information.

The display device 300 may be configured to have a display function to display content data based on the playback control information received from the information terminal 200. The display device 300 may be implemented by a projector or a display unit.

In the following, operation of the display device 300 to display the content data based on the playback control information is expressed as playback of the content data.

Moreover, the content data may be implemented by image data or video data. The image data used as the content data may be either image data indicating a single image or image data indicating two or more images. The content data may be implemented by any image data that is capable of being displayed on the display device 300.

In the following, content data which is played back by the display device 300 is called "playback content data", and other content data which is stored in a predetermined storage area is called "content data".

Next, a scenario in which the playback system 100 according to the first embodiment is utilized is explained with reference to FIG. 2. FIG. 2 is a diagram for explaining a scenario in which the playback system 100 is utilized.

In the example of FIG. 2, it is assumed that the information terminal 200 is a smart phone or a tablet PC, the display device 300 is configured to include a projector 301 and a screen 302, and the playback system 100 is utilized as a digital signage system.

If desired content data is selected by a user on the information terminal 200, the information terminal 200 generates the playback content data. If a desired playback setting of playing back the playback content data is input by the user, the information terminal 200 generates the playback control information associated with the playback content data based on the playback setting. Moreover, the information terminal 200 transmits the playback content data and the playback control information to the projector 301. The projector 301 stores the received playback content data in a storage part 32 (which will be described below) and plays back the playback content data based on the playback control information.

In this way, in the playback system 100, once the playback content data and the playback control information are transmitted from the information terminal 200 to the display device 300, the user may continuously reproduce the playback content data based on the desired playback setting. Namely, when the playback system 100 is utilized as a digital signage system, the playback content data selected by the user is automatically played back based on the user's desired playback setting, and it is no longer necessary for the user to spend the time and effort for setting up the sequence of playback of the content data or the switching between display indications on an as-needed basis.

Next, a hardware configuration of the playback system 100 is explained with reference to FIG. 3. FIG. 3 shows a hardware configuration of each of the information terminal 200 and the display device 300 of the playback system 100.

As shown in FIG. 3, the information terminal 200 includes a CPU (central processing unit) 21, a storage part 22, an input part 23, an external interface part 24, a network control part 25, an output part 26, and a driver 27. These components of the information terminal 200 are interconnected by a bus B1.

The CPU 21 is configured to control overall operations of the information terminal 200. The storage part 22 is configured to store various programs including the playback control program 210 executed by the CPU 21 and various information items associated with operations and computations of the information terminal 200. The input part 23 is configured to receive various signals and information items input by a user. The input part 23 may be configured to have a display function, such as a touch panel function. Moreover, the input part 23 may be implemented by a pointing device or a keyboard.

The external interface part 24 may be implemented by a USB (universal serial bus) memory slot or an NFC (near field communication) module. The network control part 25 is configured to include a modem or a LAN (local area network) card and used to connect the information terminal 200 to the network. The output part 26 is configured to output various information items from the information terminal 200 to the outside. The output part 26 may be implemented by a display unit, or may be implemented by a transmission unit to transmit various data items to an external device.

The playback control program 210 is at least a part of the various programs stored to control the information terminal 200. The playback control program 210 is supplied to the information terminal 200 by distribution of a recording medium 28 or by downloading the playback control program 210 from the network.

Namely, the playback control program 210 in combination with the display device 300 may be supplied to a user as a playback control system. Alternatively only the playback control program 210 may be supplied to a user in a manner separate from the display device 300. Moreover, the playback control program 210 preinstalled in the information terminal 200 may be supplied to a user as a package of the information terminal 200 with the playback control program 210.

Examples of the recording medium 28 in which the playback control program 210 is recorded include a CD-ROM, a flexible disk, a magneto-optical disk, a ROM, a flash memory, etc.

If the recording medium 28 in which the playback control program 210 is recorded is set to the driver 27, the playback control program 210 from the recording medium 28 is installed in the storage part 22 through the driver 27. If the playback control program 210 is downloaded from the network, the playback control program 210 is installed in the storage part 22 through the network control part 25.

The storage part 22 is configured to store necessary files and data items as well as the various programs including the installed playback control program 210. The playback control program 210 when read from the storage part 22 and executed by the CPU 21 causes the CPU 21 to perform various processes (which include a display control process by a first display control unit, a display control process by a second display control unit, etc. which will be described later).

Moreover, as shown in FIG. 3, the display device 300 includes a CPU 31, a storage part 32, an input part 33, an external interface part 34, a network control part 35, a display part 36, and a driver 37. These components of the display device 300 are interconnected by a bus B2.

The CPU 31 is configured to control overall operations of the display device 300. The storage part 32 is configured to store various programs including the playback program 310 executed by the CPU 31, various information items associated with operations and computations of the display device 300, and the playback content data to be played back on the display device 300. The input part 33 is configured to receive various signals and information items input by a user. The input part 33 may be implemented by an operation unit to operate the display device 300.

The external interface parts 34 may be implemented by a USB memory slot or an NFC module. The network control part 35 is configured to connect the display device 300 to the network. The display part 36 is configured to play back the playback content data on the display device 300 in accordance with a received playback instruction which identifies the playback content data.

The playback program 310 is at least a part of the various programs stored to control the display device 300. The playback program 310 is supplied to the display device 300 by distribution of a recording medium 38 or by downloading the playback program 310 from the network.

If the recording medium 38 in which the playback program 310 is recorded is set to the driver 37, the playback program 310 from the recording medium 38 is installed in the storage part 32 through the driver 37. If the playback program 310 is downloaded from the network, the playback program 310 is installed in the storage part 32 through the network control part 35.

The storage part 32 is configured to store necessary files and data items including the playback content data as well as the installed playback program 310. The playback program 310 when read from the storage part 32 and executed by the CPU 31 causes the CPU 31 to perform various processes which will be described later.

Next, a functional configuration of the playback system 100 is explained with reference to FIG. 4. FIG. 4 shows a functional configuration of each of the information terminal 200 and the display device 300 of the playback system 100.

As shown in FIG. 4, the information terminal 200 includes a predetermined storage area 220 which is provided in the storage part 22. For example, content data 221 and setting item information 222 are stored in the storage area 220. The content data 221 may be image data or video data that is capable of being played back on the display device 300. The setting item information 222 may be information that indicates setting items input by the user when generating the playback control information.

The setting item information 222 may include setting items, such as ORDER, TIME, EFFECT, etc. The setting item ORDER indicates the sequence of playback of items of the playback content data 331. In this embodiment, when the value of the setting item ORDER is 0, the sequence of playback of the items of the playback content data 331 is set to a screen-designated sequence, and when the value of the setting item ORDER is 1, the sequence of playback of the items of the playback content data 331 is set to a random sequence. The screen-designated sequence is in agreement with the sequence of selection of the content data items in a list screen of identification information items of the content data 221. The identification information items of the content data may be display information to identify the content data items, such as thumbnail images of the content data or file names of the content data.

The setting item TIME indicates a playback time of the playback content data 331. The setting item EFFECT indicates how to switch between display indications of the playback content data 331. Modes of the setting item EFFECT include FADE IN, PUSH, WIPE, etc.

The FADE IN is a method of switching between the display indications of the content data by a gradual change in resolution of the playback image. The PUSH is a method of switching between the display indications of the content data by pushing the preceding display indication to the left or right end and presenting the following display indication. The WIPE is a method of switching between the display indications by wiping off the preceding display indication and presenting the following display indication.

As shown in FIG. 4, the information terminal 200 includes a display control unit 211, an input reception unit 212, a playback-control-information generation unit 213, and a transmission unit 214.

The display control unit 211 is configured to display a list screen of identification information items of the content data 221 or a list screen of identification information items of content data selected as the playback content data 331 on the display part which is the output part 26 of the information terminal 200. Moreover, the display control unit 211 is configured to display a setting screen for inputting values of setting items included in the setting item information 222.

Moreover, the display control unit 211 includes a first display control unit 211a and a second display control unit 211b. The first display control unit 211a is configured to control the display of the list screen of the identification information items of the content data 221. The second display control unit 211b is configured to control the display of the list screen of the identification information items of the content data selected as the playback content data 331.

Furthermore, the display control unit 211 is configured to store a combined list 216 in which the identification information of the content data selected as the playback content data 331 associated with path information indicating a storing position of the content data selected as the playback content data 331 is recorded.

The input reception unit 212 is configured to receive items of the content data 221 selected by the user from the list screen in which the list of the identification information items of the content data 221 is displayed. In this embodiment, the content data 221 selected from the list screen through a user's selecting operation is transmitted from the information terminal 200 to the display device 300 as the playback content data 331 which is to be played back on the display device 300. Moreover, the input reception unit 212 is configured to receive values of the setting items which are input to the setting screen by the user, the setting screen being displayed on the information terminal 200 for inputting the values of the setting items included in the setting item information 222.

The playback-control-information generation unit 213 is configured to generate the playback control information 332 based on information included in the playback content data 331. Specifically, the playback-control-information generation unit 213 holds a setting table 215 in which respective values of the setting items are associated with the setting items included in the playback control information 332, and generates the playback control information 332 in a predetermined format by making reference to the setting table 215.

In this embodiment, the setting items (the setting items ORDER, TIME, EFFECT, etc.) included in the setting item information 222 are a part of the setting items included in the playback control information 332. Namely, the values which are input to the setting items included in the setting item information 222 by the user through the setting screen are contained in the playback control information 332.

Furthermore, the playback control information 332 generated by the playback-control-information generation unit 213 includes a content list which identifies the playback content data 331 to be played back on the display device 300.

The transmission unit 214 is configured to transmit the playback content data 331 and the generated playback control information 332 to the display device 300.

In this embodiment, the content data 221 is stored in the storage part 22. However, the present disclosure is not limited to this embodiment. For example, the content data 221 may be stored in a removable recording medium that is accessible by the information terminal 200, or may be stored in an external device that is configured to communicate with the information terminal 200.

Moreover, as shown in FIG. 4, the display device 300 includes a storage control unit 311, a verification unit 312, and a notification unit 313. The display device 300 further includes a display control unit 320 which is configured to control the display part 36.

Furthermore, the display device 300 includes a storage area 330 in which the playback content data 331 and the playback control information 332, received from the information terminal 200, are stored. Alternatively, the storage area 330 may be provided in the storage part 32 of the display device 300 or may be provided in a removable recording medium which is accessible by the display device 300. Further, the storage area 330 may be provided in an external device that is configured to communicate with the display device 300.

The storage control unit 311 is configured to store in the storage area 330 the playback content data 331 and the playback control information 332 which are received from the information terminal 200. Moreover, the storage control unit 311 is configured to set the values of the setting items included in the playback control information 332 to the display device 300 in response to a playback instruction for the playback content data 331 received from the information terminal 200.

The verification unit 312 is configured to verify that the playback content data 331 is capable of being played back on the display device 300 based on the playback control information 332. The notification unit 313 is configured to send a notification indicating a verification result from the verification unit 312 to the information terminal 200.

Next, operation of the playback system 100 according to the first embodiment is explained with reference to FIG. 5. FIG. 5 is a sequence diagram for explaining operation of the playback system 100.

If a user inputs a content data list display instruction associated with the identification information items of the content data 221 to the information terminal (step S501), the information terminal 200 causes the first display control unit 211a to display the list screen of the identification information items of the content data 221. Moreover, the information terminal 200 causes the second display control unit 211b to display the list screen of the identification information items of the content data selected as the playback content data (step S502). The details of the list screen of the identification information items of the content data selected as the playback content data and the list screen of the identification information items of the content data 221 will be described later.

Subsequently, the information terminal 200 causes the input reception unit 212 to receive the selecting operation for selecting the content data 221 (step S503). The identification information items of the selected content data received by the input reception unit 212 are displayed in the list screen by the second display control unit 211b.

In the information terminal 200, the processing of step S503 is repeated until the user's selecting operation to select the content data 221 is finished. The items of the content data 221 selected by the user in step S503 are recognized as the playback content data 331 in the information terminal 200.

Subsequently, the information terminal 200 causes the display control unit 211 to display a setting screen of the setting items included in the setting item information 222 by making reference to the setting item information 222 (step S504).

Subsequently, the information terminal 200 causes the input reception unit 212 to receive the values of the setting items input by the user in the setting screen (step S505). The user's input values of the setting items are associated with the corresponding setting items in the setting table 215, and the setting table 215 is stored. The setting items included in the setting item information 222 are as described above.

Subsequently, if a playback instruction associated with the playback content data 331 input by the user is received (step S506), the information terminal 200 causes the playback-control-information generation unit 213 to generate the playback control information 332 (step S507). Specifically, if a playback instruction input by the user is received, the playback-control-information generation unit 213 substitutes the values of the setting items stored in the setting table 215 into a predetermined format and generates the playback control information 332.

Subsequently, the information terminal 200 causes the transmission unit 214 to transmit the playback control information 332 to the display device 300 (step S508).

After the playback control information 332 is received from the information terminal 200, the display device 300 causes the storage control unit 311 to store the received playback control information 332 in the storage area 330 (step S509).

Subsequently, the information terminal 200 causes the transmission unit 214 to transmit the playback content data 331 to the display device 300 (step S510).

After the playback content data 331 is received from the information terminal 200, the display device 300 causes the storage control unit 311 to store the received playback content data 331 in the storage area 330 (step S511). For example, in the display device 300, a folder corresponding to the information terminal 200 is provided in the storage area 330, and the playback content data 331 and the playback control information 332 are stored in this folder.

Subsequently, the display device 300 causes the notification unit 313 to send to the information terminal 200 a notification indicating that storage (upload) of the playback content data 331 into the storage area 330 is finished (step S512).

After this notification is received from the display device 300, the information terminal 200 transmits a playback instruction associated with the playback content data 331 to the display device 300 (step S513). After the playback instruction is received from the information terminal 200, the display device 300 incorporates the values of the setting items included in the playback control information 332 so that playback of the playback content data 331 may be performed based on the playback control information 332.

Moreover, after the playback instruction is received, the display device 300 causes the verification unit 312 to verify that the playback content data 331 is capable of being played back based on the playback control information 332 (step S514).

Here, verification of the playback content data 331 by the verification unit 312 is explained. The verification unit 312 accesses the playback control information 332 and determines whether the playback control information 332 is in a format that is readable by the display device 300. Moreover, in the verification unit 312 accesses the playback control information 332, determines whether the value of the setting item VERSION is in agreement with that of the display device 300, and determines whether the path information of the content data 221 is included in the playback control information 332.

Subsequently, the display device 300 causes the notification unit 313 to send a verification result obtained by the verification unit 312 to the information terminal 200 (step S515). Specifically, when it is determined in step S514 that the playback content data 331 is capable of being played back, the notification unit 313 may send to the information terminal 200 a notification indicating that the transmission of the playback content data 331 has been performed successfully. After the notification from the notification unit 313 is received, the information terminal 200 displays a result of the verification (step S516).

On the other hand, when it is determined in step S514 that the playback content data 331 is not capable of being played back, the notification unit 313 sends to the information terminal 200 a notification indicating that the transmission has failed. For example, the playback content data 331 is not capable of being played back when the path information of the content data 221 is not included in the playback control information 332, when the playback control information 332 is in a format which is not readable by the display device 300, or when the value of the setting item VERSION is not in agreement with that of the display device 300.

In this embodiment, when the transmission has failed, the display device 300 causes the information terminal 200 to display a message requesting the user to re-transmit the playback content data 331. When re-transmission of the playback content data 331 is performed, the processing of steps S504-S508 is repeated in the information terminal 200. Moreover, when re-transmission of the playback content data 331 is performed, the information terminal 200 may transmit the playback content data 331 with only the values of the setting items included in the setting item information 222 to the display device 300. In this case, the display device 300 may store the values of the setting items in the corresponding setting items of the playback control information 332, and may cause the verification unit 312 to perform the verification again.

After step S516 is performed, the display device 300 plays back the playback content data 331 based on the playback control information 332 (step S517).

In the example of FIG. 5, the information terminal 200 transmits the playback control information 332 to the display device 300, and thereafter transmits the playback content data 331 to the display device 300. However, the present disclosure is not limited to this embodiment. For example, the information terminal 200 may transmit both the playback content data 331 and the playback control information 332 to the display device 300 simultaneously.

Moreover, in the example of FIG. 5, after the content data items are selected and the values of the setting items of the setting item information 222 are set up, the playback control information 332 is generated. However, the present disclosure is not limited to this embodiment. For example, the information terminal 200 may be configured to generate the playback control information 332 concurrent with the selection of the content data items from the content data 221 and the setting of the values of the setting items of the setting item information 222.

Moreover, the setting of the values of the setting items of the setting item information 222 may be performed when execution of the playback control program 210 is started. Alternatively, the setting of the values of the setting items of the setting item information 222 may be performed immediately after the content data list display instruction associated with the content data 221 is received. It is adequate that the setting of the values of the setting items of the setting item information 222 is finished prior to the generation of the playback control information 332.

Next, a user interface (display indication) provided to a user by the playback control program 210 when executed by the information terminal 200 is explained. FIG. 6 shows an example of the user interface (display indication) provided to a user by the playback control program 210 when executed by the information terminal 200.

As shown in FIG. 6, the playback control program 210 when executed by the information terminal 200 provides a display screen 600 as a user interface on the information terminal 200, in which the content data 221 is selected and a result of the selection is displayed.

The display screen 600 includes a first viewing area 610 which constitutes a list screen which displays a list of all or a part of identification information items (thumbnail images) of the content data 221 stored in the storage area 220. Moreover, the display screen 600 includes a second viewing area 620 which constitutes a list screen which displays a list of identification information items (thumbnail images) of content data which are selected from among the identification information items (thumbnail images) displayed in the first viewing area 610.

In the example of FIG. 6, it is illustrated that a selecting operation is performed to select a thumbnail image 611*a* from among thumbnail images 611 of the content data 221 which are displayed in the first viewing area 610 of the display screen 600. In order to indicate that the corresponding content data item is selected as the playback content data 331, the thumbnail image 611*a* to which the selecting operation is performed is copied to the second viewing area 620 and displayed therein as a thumbnail image 621*a*. Moreover, a check mark for indicating the corresponding content data item is selected is superimposed over the thumbnail image 611*a* of the first viewing area 610.

As described above, the display device 300 may reproduce the corresponding items of the content data 221 according to the sequence of the thumbnail images displayed in the second viewing area 620. In the case of the example of FIG. 6, the content data item corresponding to the thumbnail image 621*a* is first reproduced by the display device 300.

In this embodiment, the thumbnail images displayed in the second viewing area 620 are put in order according to the sequence of selection of the thumbnail images from the first viewing area 610. In this respect, however, the user may change arbitrarily the sequence of the thumbnail images displayed in the second viewing area 620.

Figure 7B:
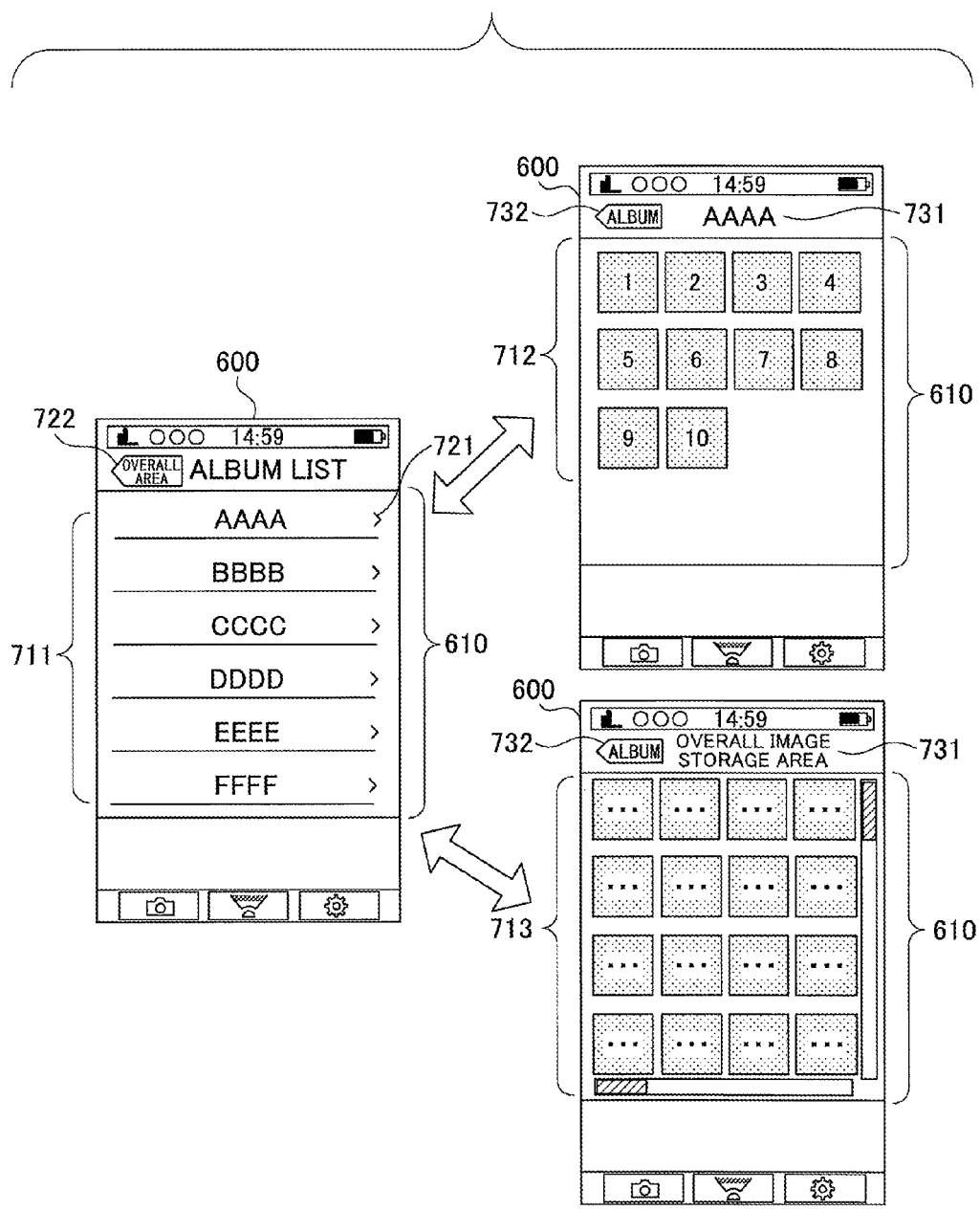

Next, a relationship between the storage area 220 and display information of the first viewing area 610 of the display screen 600 displayed by the playback control program 210 when executed by the information terminal 200 is explained. FIGS. 7A and 7B are diagrams for explaining the relationship between the storage area 220 and the display information of the first viewing area 610 of the display screen 600.

FIG. 7A shows schematically the content data 221 stored in the storage area 220. Specifically, the content data 221 is stored in an image storage area 700 in the storage area 220. Labels according to user's designation are assigned to items of the content data 221 stored in the image storage area 700. In this respect, the same label is assigned to the content data items surrounded by a corresponding dotted line in FIG. 7A. Hence, in the information terminal 200, the content data 221 may be classified into two or more groups of content data items according to the labels, and only thumbnail images of the content data items of a particular group the label of which is specified by the content data list display instruction input by the user may be displayed in the first viewing area 610.

In the example of FIG. 7A, six labels "AAAA" to "FFFF" are assigned to the content data 221 stored in the image storage area 700.

In the information terminal 200, two or more different labels may be assigned to a content data item. When two or more labels are assigned to a content data item, the thumbnail image of the content data item is displayed in the first viewing area 610 when the display instruction that specifies the corresponding one of the labels is input by the user.

For example, the label "AAAA" and the label "BBBB" are assigned to the content data 701. The thumbnail images of the content data 701 to which the label "AAAA" is assigned are displayed in the first viewing area 610 when the display instruction that specifies the group of content data items to which the label "AAAA" is assigned is input by the user. Moreover, the thumbnail images of the content data 701 to which the label "BBBB" is assigned are displayed in the first viewing area 610 when the display instruction that specifies the group of content data items to which the label "BBBB" is assigned is input by the user.

FIG. 7B shows a method of displaying in the first viewing area 610 the thumbnail images of the content data items classified into the groups according to the assigned labels. As shown in FIG. 7B, the label assigned to the group of content data items is displayed as an album name in the display screen 600.

In the information terminal 200, when the labels are assigned to the content data 221, a list of album names may be displayed in the first viewing area 610. As described above, the six labels are assigned to the content data 221 in the example of FIG. 7A, and a list of six album names is displayed in an album name list 711 in the example of FIG. 7B.

A display instruction that specifies any of the album names may be input by the user and such a display instruction may be received by the information terminal 200. Hence, if a display instruction that specifies one of the album names is input by the user, the information terminal 200 extracts the group of content data items to which the album name as the label is assigned from among the content data 221 stored in the image storage area 700. After the extracted content data items are converted into thumbnail images, the thumbnail images of the content data items are displayed in the first viewing area 610. In this case, the path information indicating a storing position of the corresponding content data is associated with the thumbnail image displayed in the first viewing area 610.

In the display screen 600 on the upper right side of FIG. 7B, it is illustrated that the user presses an arrow 721 in the display screen 60 on the left side of FIG. 7B so as to input a display instruction specifying the album name "AAAA" among the album name list 711 displayed in the first viewing area 610. When the arrow 721 is pressed, the information terminal 200 extracts the group of content data items to which the album name "AAAA" as the label is assigned. After the extracted content data items are converted into thumbnail images, the information terminal 200 displays a thumbnail image group 712 in the first viewing area 610.

Moreover, the album name "AAAA" is displayed in an area display part 731, which indicates that the thumbnail image group 712 displayed in the first viewing area 610 corresponds to the content data group to which the album name "AAAA" is assigned. In addition, the user may return to the display screen 600 in which the album name list 711 is displayed in the first viewing area 610 by pressing an album button 732 in the display screen 600 on the upper right side of FIG. 7B.

On the other hand, if an overall image storage area button 722 in the display screen 600 on the left-hand side of FIG. 7B is pressed in a state in which the album name list 711 is displayed in the first viewing area 610, the display screen on the information terminal 200 changes to the display screen 600 on the lower right side of FIG. 7B.

In this case, the information terminal 200 converts all the items of the content data 221 stored in the image storage area 700 into thumbnail images, and displays a part of the thumbnail images in the first viewing area 610 as a thumbnail image group 713. Also, in this case, the path information indicating a storing position of the corresponding content data is associated with the thumbnail image group 713 displayed in the first viewing area 610.

In a state in which the overall image storage area button 722 is pressed, the title "overall image storage area" is displayed in the area display part 731, which indicates that the thumbnail image group 713 displayed in the first viewing area 610 is a thumbnail image group of all the items of the content data 221 stored in the image storage area 700. In addition, the user may return back to the display screen 600 in which the album name list 711 is displayed in the first viewing area 610 by pressing the album button 732.

In this way, in the information terminal 200 according to this embodiment, the respective thumbnail images of the content data to which different labels are assigned may be displayed in the first viewing area 610 according to the display instructions input by the user at different times.

Figure 8A:
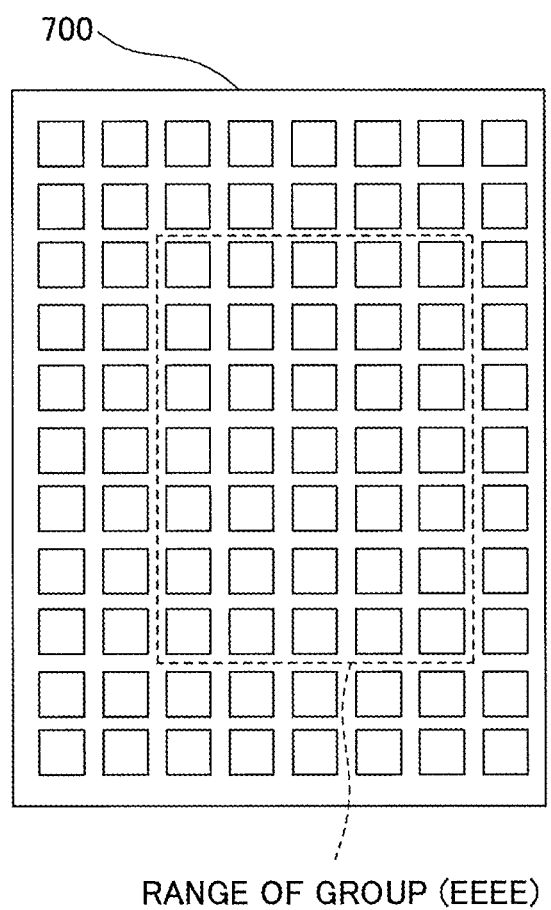

Next, a relationship between a scrolling function and display information of the first viewing area 610 of the display screen 600 displayed by the playback control program 210 when executed by the information terminal 200 is explained. FIGS. 8A and 8B are diagrams for explaining the relationship between the scrolling function and the display information of the first viewing area 610 of the display screen 600.

FIG. 8A shows schematically the content data to which the label "EEEE" is assigned among the content data 221 stored in the image storage area 700 of the storage area 220. FIG. 8B shows a state in which a display instruction specifying the album name "EEEE" is input in the album name list, the content data items to which the album name "EEEE" as the label is assigned are extracted, and the content data items are displayed in the first viewing area 610 as a thumbnail image group 811.

As shown in FIG. 8A, 35 content data items to which the album name "EEEE" is assigned are stored in the image storage area 700 of the storage area 220. If a display instruction specifying the album name "EEEE" is input by the user, the information terminal 200 extracts the 35 content data items from the image storage area 700 of the storage area 220, and converts the extracted content data items into thumbnail images.

In the example of FIG. 8B, a case in which the thumbnail images labeled with numeral characters "1" to "35" are generated is illustrated for the sake of convenience of description.

Here, it is assumed that the information terminal 200 is configured so that only 4×4 thumbnail images may be displayed in the first viewing area 610 at a time. If the user inputs a display instruction that specifies the album name "EEEE", the user views only a part of the thumbnail images of the content data items to which the album name "EEEE" is assigned.

Specifically, in a thumbnail image group 811 shown in the left-hand side of FIG. 8B, only the thumbnail images "1"-"4", "6"-"9", "11"-"14", and "16"-"19" are viewed. On the other hand, the remaining thumbnail images may be viewed in the first viewing area 610 if the user performs a sliding operation to move a slider bar 801 in the downward direction and/or the rightward direction. In the display screen 600 on the right-hand side of FIG. 8B, it is illustrated that a thumbnail image group 811' a part of which has not been viewed may be fully viewed by performing a sliding operation to move the slider bar 801 in the downward direction and the rightward direction.

Specifically, in the example of the thumbnail image group 811' of the display screen 600 on the right-hand side of FIG. 8B, the thumbnail images "17"-"20", "22"-"25", "27"-"30", and "32"-"35" may be viewed.

In the example of FIG. 8B, the slider bar 801 is displayed for the sake of convenience of description. However, the present disclosure is not limited to this embodiment. The information terminal 200 may be configured so that the thumbnail image group displayed in the first viewing area 610 is slidable in any of the upward, downward, rightward and leftward directions, regardless of whether the slider bar 801 is displayed.

In this way, the information terminal 200 according to this embodiment is configured so that performing a sliding operation on the thumbnail image group is effective when the thumbnail image group exceeding the number of the thumbnail images which may be displayed in the first viewing area 610 is displayed in the first viewing area 610. Hence, the user may display the thumbnail images arranged in a predetermined formation in the first viewing area 610 at different times by performing the sliding operation on the thumbnail image group. Therefore, in the information terminal 200, the thumbnail images arranged in the predetermined formation may be displayed in the first viewing area 610 according to the display instructions (sliding operation) input by the user at different times.

Figure 9A:
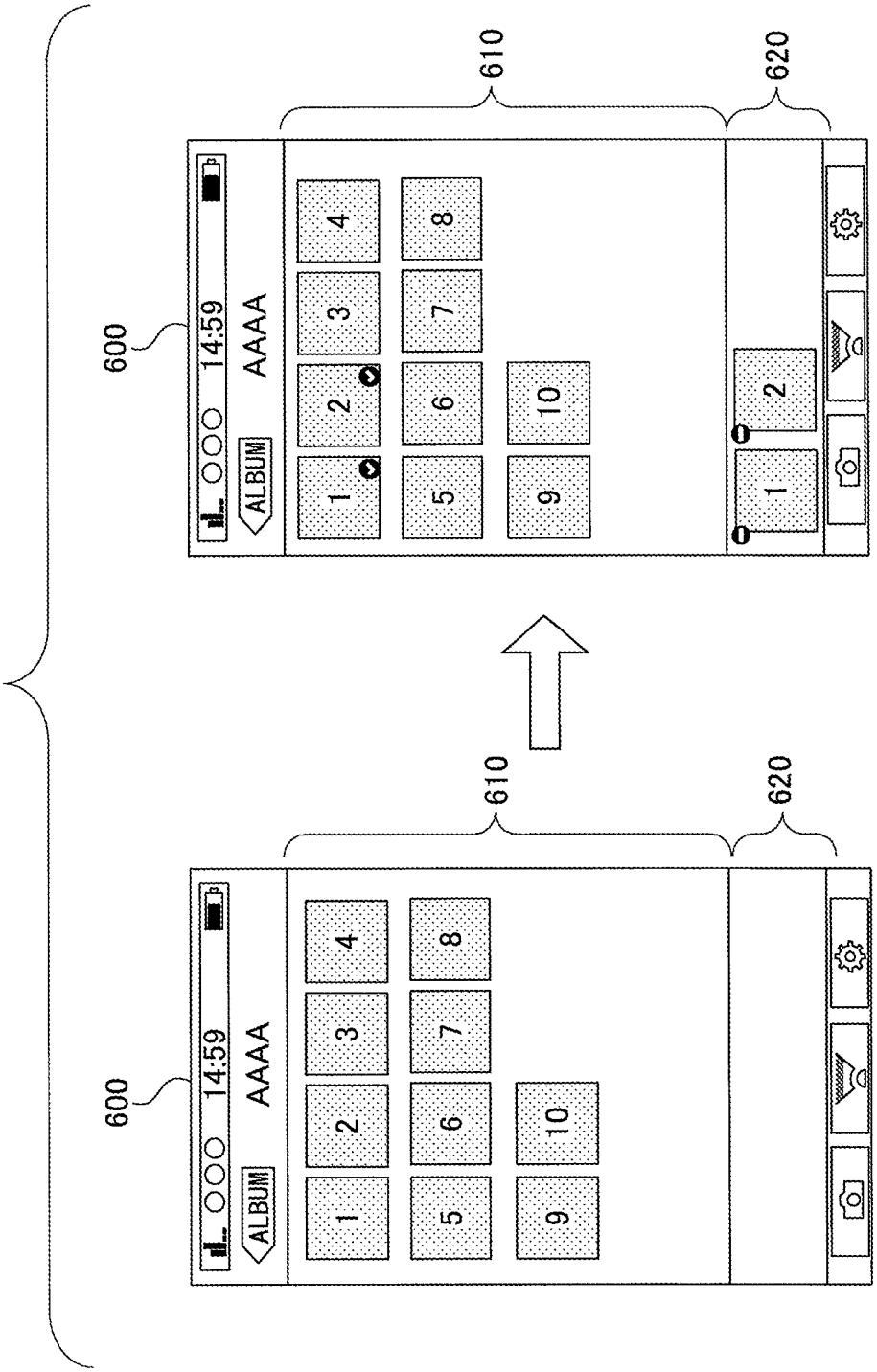

Next, a selecting operation and a selection cancelling operation of the content data are explained. FIGS. 9A and 9B are diagrams for explaining a selecting operation for selecting content data in the information terminal 200 and a selection cancelling operation for cancelling selection of content data.

As shown in FIG. 9A, in a state in which the thumbnail images are displayed in the first viewing area 610 according to a user's display instruction, the user may select a content data item by performing a tap operation on a corresponding one of the thumbnail images.

The thumbnail image to which the tap operation is performed is copied with the associated path information, and the thumbnail image is displayed in the second viewing area 620. In this way, the thumbnail image to which the selecting operation is performed is displayed in the second viewing area 620, and the user may confirm that the content data item corresponding to the thumbnail image has been selected as the playback content data. In addition, a check mark is superimposed over the thumbnail image displayed in the first viewing area 610 in the information terminal 200. Hence, by the check mark, the user may confirm that the content data item corresponding to the thumbnail image is selected as the playback content data.

On the other hand, as shown in FIG. 9B, in a state in which the thumbnail image is displayed in the second viewing area 620, selection of the corresponding playback content data may be cancelled by performing a tap operation again to the corresponding thumbnail image in the first viewing area 610.

If the selection is cancelled, the thumbnail image displayed in the second viewing area 620 is deleted. Moreover, the check mark on the corresponding thumbnail image displayed in the first viewing area 610 is also deleted. Thereby, selection of the playback content data corresponding to the thumbnail image is cancelled, and the user may confirm that it is no longer the playback content data.

In this way, in the information terminal 200 according to this embodiment, a content data item may be selected by performing a tap operation on the corresponding thumbnail image displayed in the first viewing area 610, and the selection of the content data item may be cancelled by performing the tap operation again.

Namely, in the information terminal 200 according to this embodiment, the tap operation performed on the thumbnail image displayed in the first viewing area 610 is recognized as the selection instruction or the selection cancellation instruction.

Next, a relationship between display information of the first viewing area 610 and display information of the second viewing area 620 in the display screen 600 displayed by the playback control program 210 when executed is explained.

FIGS. 10A to 10E are diagrams for explaining a relationship between display information of the first viewing area 610 and display information of the second viewing area 620 based on a user's display instruction. FIG. 10A illustrates a state of display information on the information terminal 200 in which a display instruction specifying the album name "AAAA" is input by a user and a group of thumbnail images of the content data to which the album name "AAAA" is assigned are displayed in the first viewing area 610.

If a tap operation is performed on the thumbnail images "1" and "2" in the state shown in FIG. 10A, the thumbnail images are displayed in the second viewing area 620 as shown in FIG. 10B. Subsequently, if the album button 732 is pressed by the user, the album name list 711 is displayed in the first viewing area 610 as shown in FIG. 10C.

At this time, the display information of the second viewing area 620 is maintained. Namely, even if the display information of the first viewing area 610 is changed by the user's display instruction, the second viewing area 620 itself is maintained and the display information of the second viewing area 620 also remains unchanged.

Here, it is assumed that the user presses the arrow 721 to input a display instruction specifying the album name "FFFF", in the state in which the album name list 711 is displayed. In this case, a group of thumbnail images of the content data to which the album name "FFFF" is assigned is displayed in the first viewing area 610 as shown in FIG. 10D.

Moreover, the display information of the second viewing area 620 is maintained also in this case. Hence, if a tap operation is performed by the user on a thumbnail image "108" in the state shown in FIG. 10D, the thumbnail image is displayed additionally in the second viewing area 620 as shown in FIG. 10E.

In this way, after the display screen 600 is displayed by the playback control program 210 when executed by the information terminal 200, the display information of the second viewing area 620 is maintained regardless of whether the display information of the first viewing area 610 is changed or not.

Namely, even if the object displayed in the first viewing area 610 is changed by a user's display instruction, the display information of the already selected content data items in the second viewing area 620 is maintained. Moreover, the display of the thumbnail images of the selected content data in the second viewing area 620 is also maintained.

Hence, the user may always perform a selecting operation while checking which of the content data is selected.

Next, a relationship between display information of the first viewing area 610 and display information of the second viewing area 620 in the display screen 600 displayed by playback control program 210 when executed is explained.

Figure 11A:
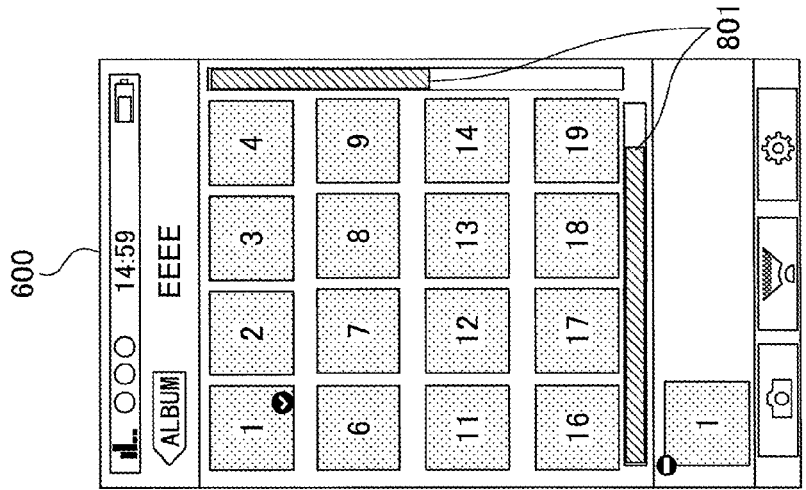
FIGS. 11A to 11D are diagrams for explaining a relationship between display information of the first viewing area and display information of the second viewing area.

FIGS. 11A to 11D are diagrams for explaining the relationship between display information of the first viewing area 610 and display information of the second viewing area 620 based on a user's sliding operation. FIG. 11A illustrates a state of display information on the information terminal 200 in which a display instruction specifying the album name "EEEE" is input by the user and a group of thumbnail images of the content data to which the album name "EEEE" is assigned is displayed in the first viewing area 610.

Figure 11B:
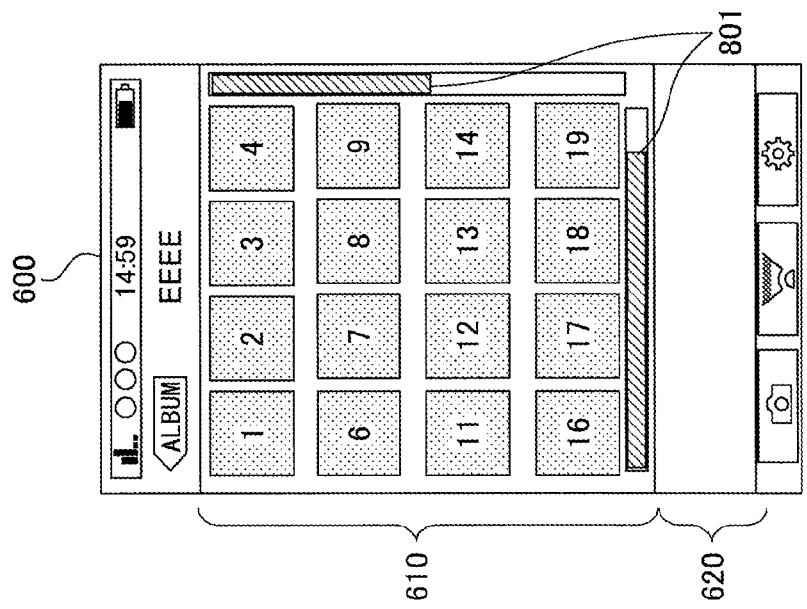
Figure 11C:
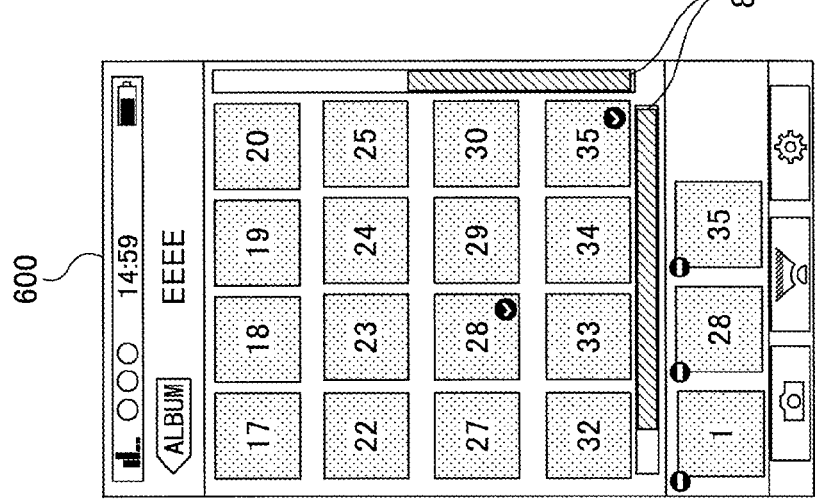

If a tap operation is performed on the thumbnail image "1" among the thumbnail images displayed in the first viewing area 610 in the state shown in FIG. 11A, the thumbnail image is displayed in the second viewing area 620 as shown in FIG. 11B. Subsequently, if a sliding operation is performed by the user, the thumbnail image "1" goes out of sight in the first viewing area 610 as shown in FIG. 11C. On the other hand, another group of thumbnail images which was out of sight in the first viewing area 610 in the state shown in FIG. 11A appears in the first viewing area 610.

Even in such a case, the display information of the second viewing area 620 is maintained. Namely, even if the display information of the first viewing area 610 is changed by the user's sliding operation and the thumbnail images corresponding to the thumbnail images displayed in the second viewing area 620 go out of sight in the first viewing area 610, the display information of the second viewing area 610 remains unchanged.

Figure 11D:
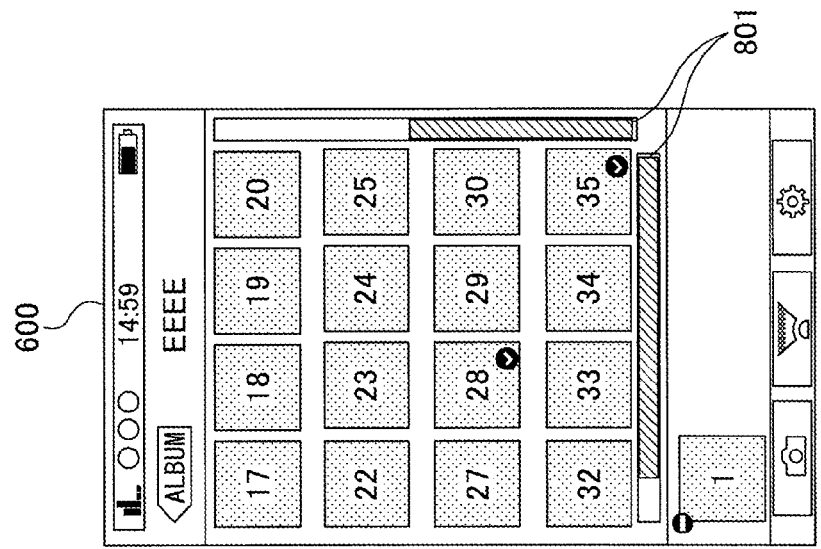

Moreover, if a tap operation is performed on a thumbnail image "35" among the thumbnail images displayed in the first viewing area 610 in the state shown in FIG. 11C, the thumbnail image is displayed additionally in the second viewing area 620 as shown in FIG. 11D.

Namely, even if the object displayed in the first viewing area 610 is changed by a user's display instruction (sliding operation), the display information of the already selected content data items in the second viewing area 620 is maintained. Moreover, the display of the thumbnail images of the selected content data in the second viewing area 620 is also maintained.

Hence, the user may always perform a selecting operation while checking which of the content data is selected. This configuration is convenient for the user especially when many thumbnail images are displayed in the first viewing area 610, or when the user wishes to perform several selecting operations in a sequence different from the sequence of the thumbnail images displayed in the first viewing area 610.

Next, a relationship between start and end operations of the playback control program 210 and display information of the second viewing area 620 in the display screen 600 displayed by the playback control program 210 when executed is explained.

FIGS. 12A to 12C are diagrams for explaining the relationship between start and end operations of the playback control program 210 and display information of the second viewing area 620.

FIG. 12A illustrates a state of display information on the information terminal 200 in which content data items corresponding to thumbnail images "1" and "2" are selected when a group of thumbnail images of the content data to which the album name "BBBB" is assigned is displayed in the first viewing area 610.

Here, it is assumed that an end instruction of the playback control program 210 is input by a user in the state shown in FIG. 12A and the playback control program 210 is terminated. FIG. 12B illustrates a state in which the playback control program 210 is terminated.

Moreover, it is assumed that a start instruction of the playback control program 210 is input by the user in the state as shown in FIG. 12B, and the playback control program 210 is started again. FIG. 12C illustrates a state of the display information on the information terminal 200 immediately after the playback control program 210 is started again.

If the playback control program 210 is started, the thumbnail images of the content data 221 stored in the overall image storage area 700 of the storage area 220 are displayed in the first viewing area 610 as shown in FIG. 12C. On the other hand, the thumbnail images which have been displayed in the second viewing area 620 when the playback control program 210 is terminated are displayed again in the second viewing area 620 as shown in FIG. 12C.

In this way, in the information terminal 200 according to this embodiment, even if the playback control program 210 is terminated, the thumbnail images displayed in the second viewing area 620 are maintained. Hence, when the playback control program 210 is started again, the state of the display information of the second viewing area 620 which is the same as the state immediately before the end of the playback control program 210 is reproduced.

Figure 13:
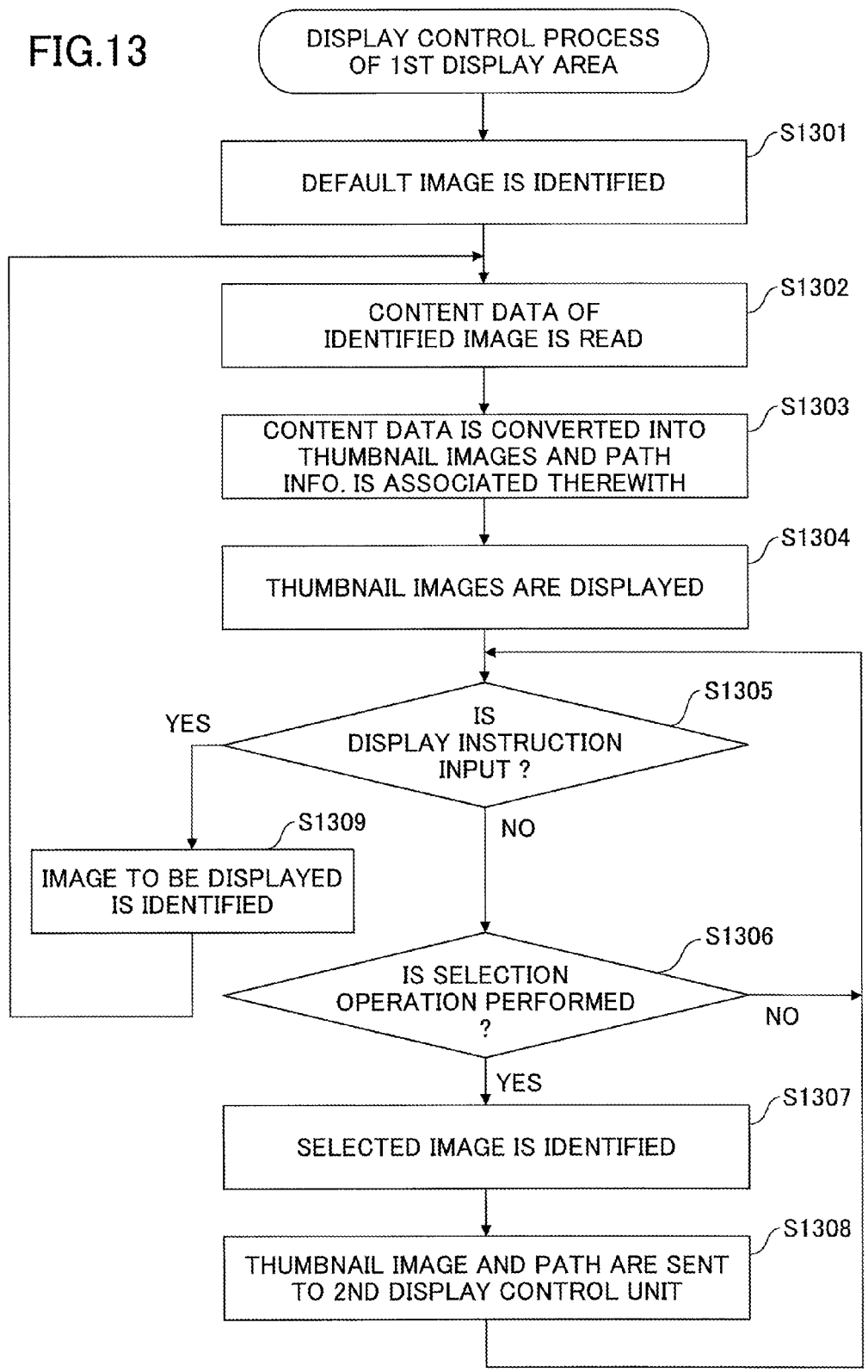
FIG. 13 is a flowchart for explaining a display control process of the first viewing area performed by a first display control unit of the playback control program.

Next, a display control process of the first viewing area 610 performed by the first display control unit 211a of the playback control program 210 when executed is explained. FIG. 13 is a flowchart for explaining the display control process of the first viewing area 610 performed by the first display control unit 211a of the playback control program 210.

Upon starting of the playback control program 210, the display control process of the first viewing area 610 shown in FIG. 13 is performed. A default displaying object is identified in step S1301. In this embodiment, the image storage area 700 is set up as the default displaying object. Hence, in step S1301, the image storage area 700 is identified as the default displaying object.

In step S1302, content data is read from the displaying object identified in step S1301. In this embodiment, the content data 221 stored in the image storage area 700 is read.

In step S1303, the content data 221 read in step S1302 is converted into thumbnail images and the path information of the content data 221 is associated with each of the thumbnail images.

In step S1304, the thumbnail images generated in step S1303 are displayed in the first viewing area 610. In step S1305, it is determined whether a display instruction to display another displaying object is input by the user. Specifically, it is determined whether a display instruction specifying a particular album name is input by the user, whether the image storage area button 722 is pressed by the user, or whether a sliding operation is performed by the user.

When it is determined in step S1305 that a display instruction specifying another displaying object is input by the user, the control progresses to step S1309 in which the displaying object specified by the input display instruction is identified. Subsequently, the control is returned back to step S1302 in which the content data is read from the identified displaying object. For example, in step S1302, a group of content data items to which the particular album name is assigned is read.

On the other hand, when it is determined in step S1305 that a display instruction specifying another displaying object is not input by the user, the control progresses to step S1306. In step S1306, it is determined whether a tap operation as a selecting operation is performed on a thumbnail image displayed in the first viewing area 610.

When it is determined in step S1306 that a tap operation as a selecting operation is not performed, the control is returned to step S1305. On the other hand, when it is determined in step S1306 that a tap operation as a selecting operation is performed, the control progresses to step S1307. In step S1307, the displaying object which is selected by the tap operation is identified.

In step S1308, a thumbnail image corresponding to the displaying object identified in step S1307 is copied, and the thumbnail image and its path information are transmitted to the second display control unit 211b which performs a display control process of the second viewing area 620.

Subsequently, each time a display instruction in which the displaying object is changed is input by the user, a thumbnail image of a corresponding content data item is displayed in the first viewing area 610. Moreover, each time a content data item is selected by a tap operation as a selecting operation, a thumbnail image of the corresponding content data item is copied and the thumbnail image and its path information are transmitted to the second display control unit 211b.

Next, a display control process of the second viewing area 620 performed by the second display control unit 211b of the playback control program 210 when executed is explained. FIG. 14 is a flowchart for explaining the display control process of the second viewing area 620 performed by the second display control unit 211b of the playback control program 210.

Upon starting of the playback control program 210, the display control process of the second viewing area 620 shown in FIG. 14 is performed. The combined list 216 is read in step S1401. As described above, the thumbnail image and the path information of the content data selected as the playback content data are recorded in the combined list 216. Moreover, the thumbnail image and the path information which are associated with each other and recorded in the combined list 216 are maintained regardless of whether the playback control program 210 is started or terminated and regardless of whether the power of the information terminal 200 is turned ON or OFF.

Hence, the thumbnail images of the playback content data selected immediately before the playback control program 210 is previously terminated may be obtained by reading the combined list 216 in step S1401 upon starting of the playback control program 210.

In step S1402, the thumbnail images read in step S1401 are displayed in the second viewing area 620.

In step S1403, it is determined whether the thumbnail images and the path information are received from the first display control unit 211a. When it is determined in step S1403 that the thumbnail images and the path information are not received, the control is returned to step S1403 until a result of the determination at step S1403 is affirmative.

On the other hand, when it is determined in step S1403 that the thumbnail images and the path information are received from the first display control unit 211a, the control progresses to step S1404. In step S1404, the received thumbnail images are displayed in the second viewing area 620. The received thumbnail images are displayed in the second viewing area 620 additionally in a position on the right-hand side of the already displayed thumbnail images.

In step S1405, the combined list 216 is updated by adding the thumbnail images and the path information received in step S1403 to the combined list 216.

In step S1406, it is determined whether a selection cancellation instruction is input by the user. When it is determined in step S1406 that a selection cancellation instruction is not input, the control is returned to step S1403. On the other hand, when it is determined in step S1406 that a selection cancellation instruction is input, the control progresses to step S1407. In step S1407, the content data item which is the target of the selection cancellation instruction is identified.

In step S1408, a thumbnail image corresponding to the content data item identified in step S1407 is deleted from the second viewing area 620. Moreover, in step S1409, the combined list 216 is updated by deleting the corresponding thumbnail image and the path information in the combined list 216.

Subsequently, the processing of steps S1403 to S1409 is repeated until the playback control program 210 is terminated.

As described in the foregoing, the playback system 100 according to this embodiment provides the following features.

The display screen 600 including the first viewing area 610 and the second viewing area 620 which are provided in the same screen is configured as a display screen used by the user to select content data items.

The identification information items of all or a part of the content data items stored in the storage area are displayed in the first viewing area 610.

By using the labels assigned to the content data, the content data items are classified into groups according to the labels. Moreover, when a display instruction specifying a group is input, the content data items belonging to the group are extracted and the identification information items of the extracted content data items are displayed.

The identification information items which are selected by the user from among the identification information items displayed in the first viewing area are displayed in the second viewing area 620.

Even if a display instruction specifying another displaying object to be displayed in the first viewing area is input, the identification information displayed in the second viewing area 620 is maintained.

The identification information displayed in the second viewing area 620 is maintained even after the playback control program is terminated, and when the playback control program is started again, the identification information of the content data selected immediately before the playback control program is terminated is displayed.

In this embodiment, the display information of the second viewing area 620 in which the selection result is displayed is maintained regardless of whether the display information of the first viewing area 610 in which the displaying object is displayed is changed. Hence, the user may always perform the selecting operation while checking the selection result even when the displaying object is changed.

As a result, it is possible to improve usability when performing the selecting operation to select the group of content data items as the displaying object.

Second Embodiment

In the first embodiment described above, by performing a tap operation on a thumbnail image displayed in the first viewing area 610, a content data item corresponding to the thumbnail image is selected as the playback content data and the selection of the content data item is cancelled.

However, the present disclosure is not limited to this embodiment. For example, by specifying a thumbnail image displayed in the first viewing area 610 by voice input, the content data item corresponding to the specified thumbnail image may be selected as the playback content data. Moreover, the selection of the playback content data corresponding to the selected thumbnail image may be cancelled by voice input.

Figure 15B:
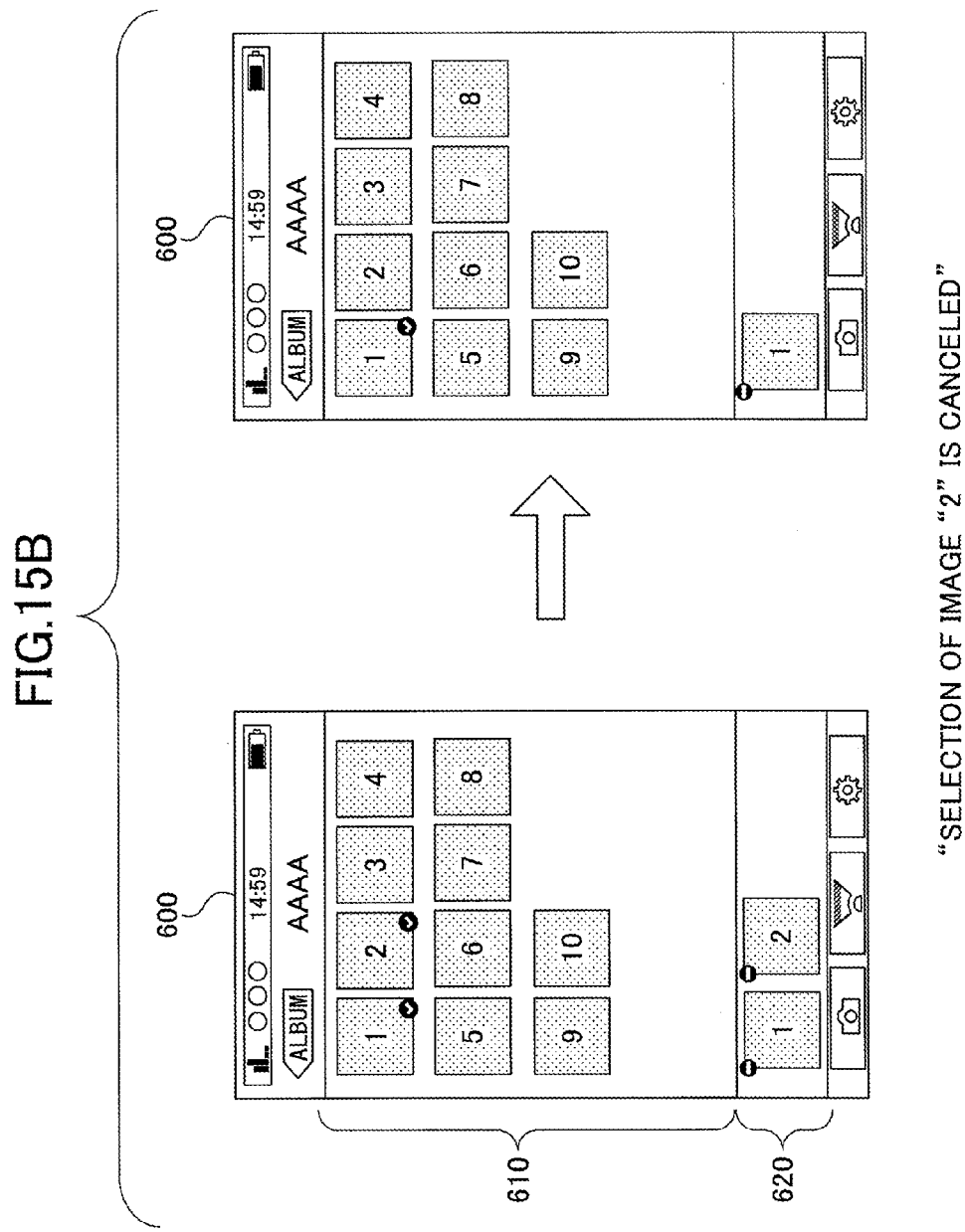

FIGS. 15A and 15B are diagrams for explaining a selecting operation for selecting content data and a selection cancelling operation for cancelling selection of content data by voice input.

As shown in FIG. 15A, in a state in which thumbnail images of the content data which are specified by a display instruction input by the user are displayed in the first viewing area 610, the user may input a selection instruction specifying one of the thumbnail images by voice. In the example of FIG. 15A, the manner the selection instruction is input by the user by saying that image "1" is selected is illustrated.

The thumbnail image which is specified by the selection instruction is copied with the path information associated, and displayed in the second viewing area 620.

Moreover, as shown in FIG. 15B, in a state in which the thumbnail image already selected as the playback content data is displayed in the second viewing area 620, the user may input a selection cancellation instruction specifying the thumbnail image by voice. In the example of FIG. 15B, the manner the selection cancellation instruction is input by the user by saying that selection of image "2" is cancelled is illustrated.

In addition to the previously described configuration of the first embodiment, the playback system 100 according to this embodiment is configured so that the user may input a selection instruction specifying the playback content data by voice input, and may input a selection cancellation instruction specifying the playback content data by voice input.

As a result, in addition to the effects which are the same as those of the first embodiment, it is possible for the playback system 100 according to this embodiment to reduce the load of user's selecting operation for generating the content data as the playback object.

Third Embodiment

In the foregoing embodiments, the thumbnail images selected from the thumbnail images in the first viewing area 610 by the selecting operation and received from the first display control unit 211a are arranged sequentially from the left end of the second viewing area 620. However, the present disclosure is not limited to this embodiment.

For example, when the thumbnail images are displayed near the right end of the second viewing area 620, the thumbnail images displayed in the second viewing area 620 may be automatically moved leftward. Thereby, the thumbnail image of the newly selected content data may be always displayed near the right end of the second viewing area 620, and it is possible for the user to easily check the selection result by the latest selecting operation.

Figure 16A:
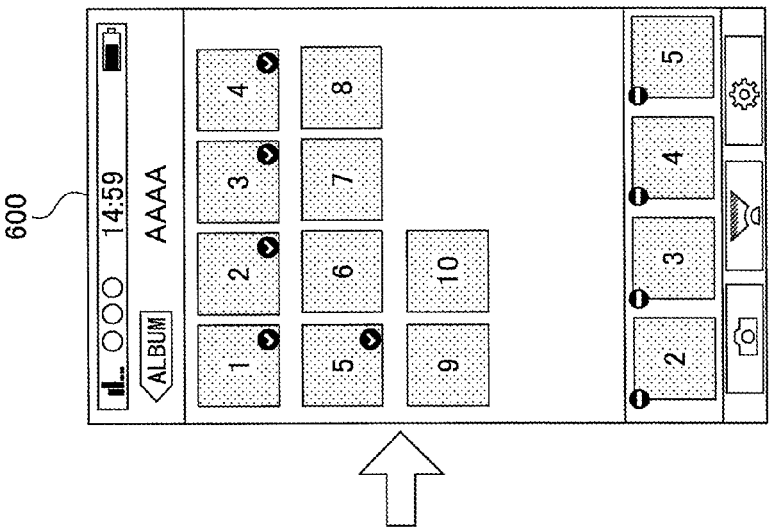
FIGS. 16A to 16C are diagrams showing an example of thumbnail images displayed in the second viewing area.
Figure 16B:
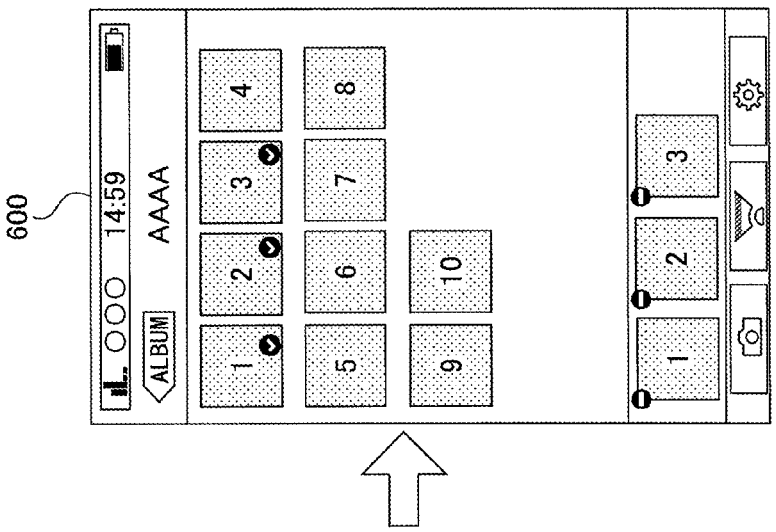
Figure 16C:
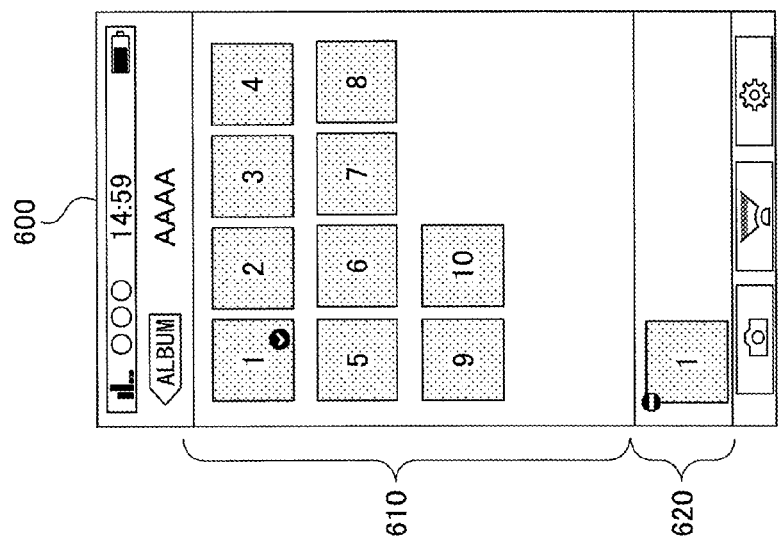

FIGS. 16A to 16C show an example of thumbnail images displayed in the second viewing area 620 in the information terminal 200 according to this embodiment when a selecting operation is performed on the thumbnail images.

As shown in FIG. 16A, a thumbnail image of a first selected content data item is arranged at the left end of the second viewing area 620. Moreover, as shown in FIG. 16B, thumbnail images of subsequently selected content data items are arranged sequentially from a position on the right-hand side of the thumbnail image of the previously selected content data item.

Furthermore, as shown in FIG. 16C, when there is no additional space in the second viewing area 620 on the right-hand side of the thumbnail image of the previously selected content data item, the thumbnail images of the previously selected content data items are moved leftward by a distance corresponding to the thumbnail images of the newly selected content data items.

Thereby, as shown in FIG. 16C, the thumbnail images of the subsequently selected content data items may be arranged on the right-hand side of the thumbnail images of the previously selected content data items.

In addition to the previously described configuration of the foregoing embodiments, the playback system 100 according to this embodiment is configured so that the thumbnail images of the newly selected content data items are arranged in the second viewing area 620 on the right-hand side of the thumbnail images of the previously selected content data items, and that, when there is no additional space in the second viewing area 620 on the right-hand side of the thumbnail images of the previously selected content data items, the thumbnail images of the previously selected content data items are automatically moved leftward by a distance corresponding to the thumbnail images of the newly selected content data items.

As a result, it is possible to always display the thumbnail images of the newly selected content data items near the right-hand end of the second viewing area 620, and even if the number of selected content data items increases, the user may easily check the selection result by the latest selecting operation.

Fourth Embodiment

In the foregoing embodiments, no display indication is performed when a selecting operation to select a thumbnail image is not yet performed and no thumbnail image is displayed in the second viewing area 620. The playback system according to this embodiment may be configured so that a display indication which urges the user to perform a selecting operation is performed.

Figure 17:
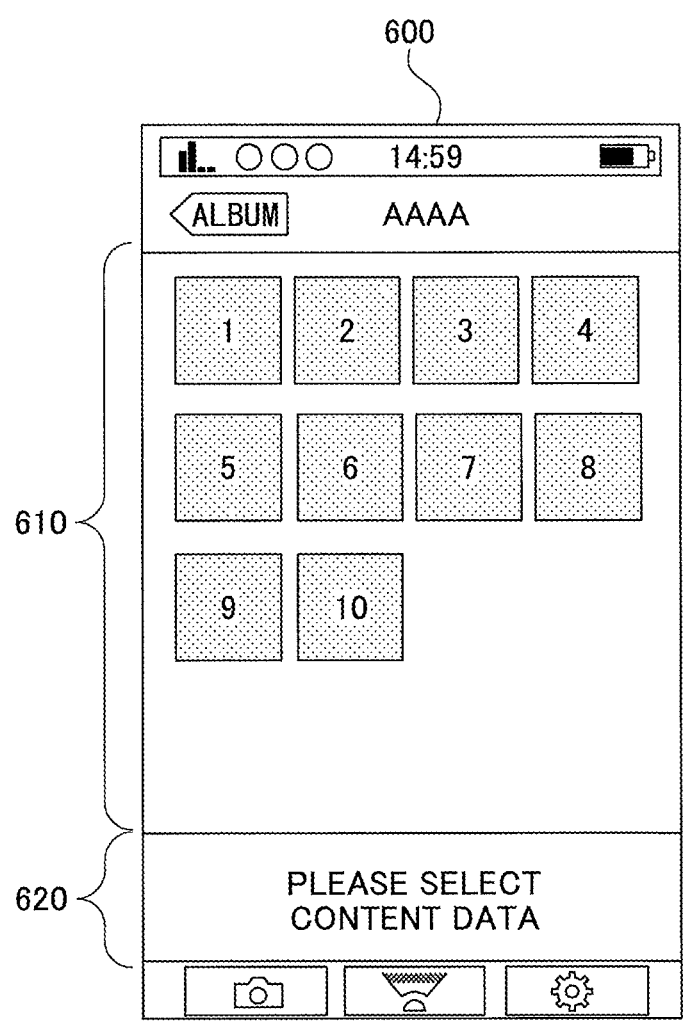
FIG. 17 is a diagram showing an example of a display indication of the second viewing area in a state in which none of thumbnail images displayed in the first viewing area is selected.

FIG. 17 shows an example of a display indication of the second viewing area 620 in a state in which none of the thumbnail images displayed in the first viewing area 610 is selected.

As shown in FIG. 17, in a state in which no selecting operation is performed on the thumbnail images displayed in the first viewing area 610, a message such as "Please select content data" which urges the user to perform a selecting operation for selecting content data is displayed in the second viewing area 620. The message disappears when a selecting operation is performed on the thumbnail images displayed in the first viewing area 610. However, even after the selecting operation is performed on the thumbnail images, if a selection cancelling operation for cancelling selection of content data is performed and the number of the thumbnail images displayed in the second viewing area 620 becomes zero again, the message is displayed in the second viewing area 620.

In addition to the previously described configuration of the foregoing embodiments, the playback system 100 according to this embodiment is configured so that, when the number of thumbnail images displayed in the second viewing area 620 is zero, a predetermined message is displayed in the second viewing area 620.

As a result, in addition to the effects which are the same as those of the foregoing embodiments, it is possible for the playback system 100 according to this embodiment to urge the user to select content data.

In the above-described embodiment, the message which urges the user to select content data is displayed in the second viewing area 620. However, the area where the message is displayed is not limited to this embodiment. The area where the message is displayed may be an arbitrary area within the display screen 600.

Fifth Embodiment

In the first embodiment described above, a tap operation is performed on a thumbnail image displayed in the first viewing area 610 to select the content data item corresponding to the thumbnail image, and a tap operation is performed again on the thumbnail image to cancel selection of the content data item. However, the present disclosure is not limited to this embodiment.

For example, the playback system may be configured so that a tap operation performed on a thumbnail image displayed in the second viewing area 620 is recognized as a selecting operation, and a tap operation performed on a thumbnail image displayed in the first viewing area 610 is recognized as being a selection cancelling operation.

FIGS. 18A and 18B are diagrams for explaining a selecting operation for selecting content data and a selection cancelling operation for cancelling selection of content data in the information terminal 200 according to this embodiment.

FIG. 18A shows a state in which thumbnail images are displayed in the first viewing area 610 according to a display instruction input by the user, and some content data items are selected so that corresponding thumbnail images are displayed in the second viewing area 620.

In the information terminal 200 according to this embodiment, for example, if a tap operation is performed on the thumbnail image "2" in the second viewing area 620 in the state shown in FIG. 18A, selection of the content data corresponding to the thumbnail image is cancelled as shown in FIG. 18B.

As shown in FIG. 18B, the thumbnail image "2" displayed in the second viewing area 620 is deleted and a check mark superimposed over the thumbnail image "2" displayed in the first viewing area 620 disappears. As a result, the user may confirm that selection of the content data item corresponding to the thumbnail image "2" has been cancelled.

In the above-described embodiment, selection of the content data item corresponding to the thumbnail image is cancelled when a tap operation is performed on the thumbnail image displayed in the second viewing area 620. However, the present disclosure is not limited to this embodiment. For example, the playback system 100 may be configured so that when a tap operation is performed on a mark superimposed over an upper left corner of the thumbnail image displayed in the second viewing area 620, selection of the content data item corresponding to the thumbnail image is cancelled.

Sixth Embodiment

In the first embodiment described above, a selection cancelling operation for cancelling selection of content data is performed on the thumbnail image arrayed at the right-hand end among the thumbnail images displayed in the second viewing area 620. However, the present disclosure is not limited to this embodiment.

Figure 19C:
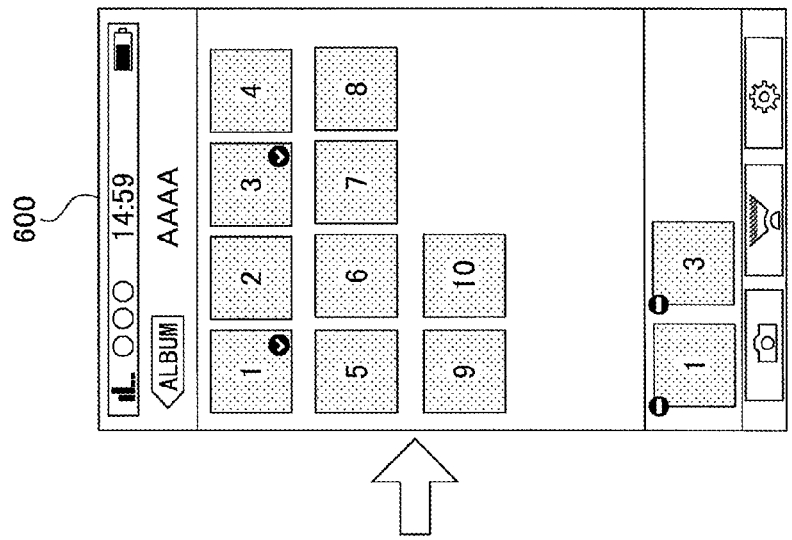
FIGS. 19A to 19C are diagrams for explaining a selection cancelling operation for cancelling selection of content data.
Figure 19B:
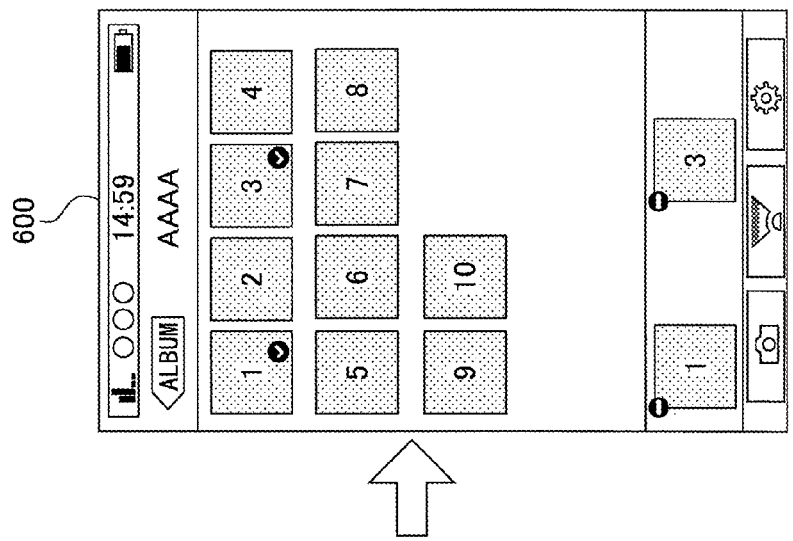
Figure 19A:
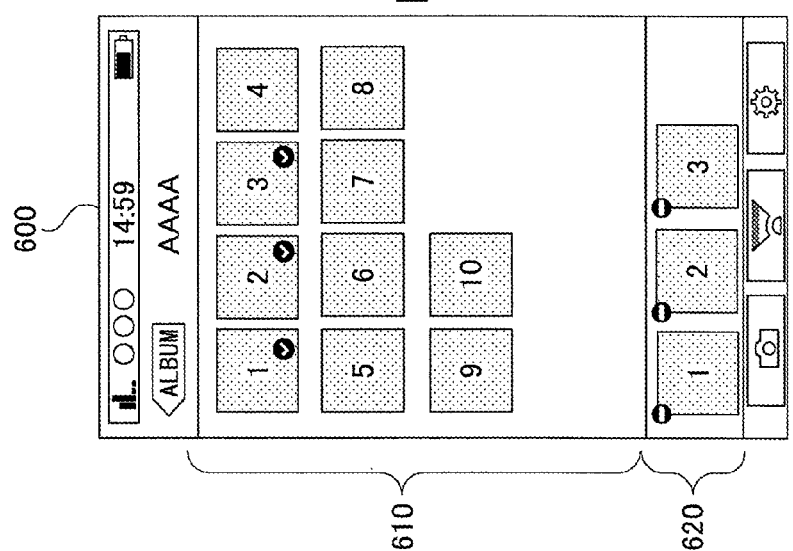

For example, as shown in FIGS. 19A to 19C, a selection cancelling operation for cancelling selection of content data may be performed on a thumbnail image other than the thumbnail image arrayed at the right-hand end among the thumbnail images displayed in the second viewing area 620.

In the example of FIGS. 19A to 19C, three thumbnail images are displayed in the second viewing area 620 (FIG. 19A) and a selection cancelling operation is performed on a central thumbnail image (thumbnail image "2") among these thumbnail images.

In this case, after the central thumbnail image (thumbnail image "2") is deleted (FIG. 19B), the thumbnail image (thumbnail image "3") located on the right-hand side of the deleted thumbnail image is automatically moved leftward (FIG. 19C). Namely, the thumbnail images are displayed in the second viewing area 620 at equal intervals and in a state of left-justification.

In the above-described example, a selection cancelling operation for cancelling selection of content data is performed when the number of thumbnail images displayed in the second viewing area 620 is less than or equal to the number of thumbnail images that can be displayed in the second viewing area 620. However, the present disclosure is not limited to this embodiment.

For example, the information terminal 200 in the playback system 100 may be configured so that, even when the number of thumbnail images displayed in the second viewing area 620 is greater than the number of thumbnail images that can be displayed in the second viewing area 620, a selection cancelling operation is performed on any of the thumbnail images in the second viewing area 620 (FIGS. 20A to 20D).

In the example of FIG. 20A, a selecting operation is performed on five thumbnail images "1"-"5" and the thumbnail images "2"-"5" are displayed in the second viewing area 620.

If a selection cancelling operation for cancelling selection of the content data item corresponding to the thumbnail image "3" is performed in the state of FIG. 20A, the thumbnail image "3" is deleted from the second viewing area 620 (FIG. 20B). Moreover, the thumbnail images (thumbnail images "4" and "5") located on the right-hand side of the deleted thumbnail image are automatically moved leftward (FIG. 20C).

By the leftward movement of the thumbnail images "4" and "5", the three thumbnail images are temporarily displayed in the second viewing area 620. On the other hand, four thumbnail images at the maximum may be displayed in the second viewing area 620, and the thumbnail image "1" (which is not displayed in the second viewing area 620) exists on the left-hand side of the three thumbnail images. If it is recognized by the information terminal 200 that the non-displayed thumbnail image exists, the group of thumbnail images is moved, in a direction that allows the non-displayed thumbnail image to appear, until the number of thumbnail images which can be displayed in the second viewing area 620 is reached.

In the example of FIG. 20D, the group of thumbnail images in the second viewing area 620 is moved rightward and the movement of the thumbnail images is stopped when the thumbnail image "5" reaches the right-hand end of the second viewing area 620.

In the information terminal 200 according to this embodiment, even when a selection cancelling operation for cancelling selection of content data is performed and the corresponding thumbnail image is deleted, the remaining thumbnail images are left-justified and displayed in the second viewing area 620 at equal intervals. Moreover, when the number of thumbnail images displayed in the second viewing area 620 is greater than the number of thumbnail images that can be displayed in the second viewing area 620, the group of thumbnail images is moved until the number of thumbnail images which can be displayed in the second viewing area 620 is reached.

As a result, the user may easily check which content data is selected even when a selection cancelling operation is performed.

Seventh Embodiment

In the foregoing embodiments, the sequence of the thumbnail images displayed in the second viewing area 620 is in agreement with the sequence of selection of the thumbnail images from the first viewing area 610. However, the present disclosure is not limited to these embodiments.

For example, the sequence of the thumbnail images displayed in the second viewing area 620 may be changed arbitrarily.

FIGS. 21A to 21E are diagrams for explaining a change operation for changing a sequence of playback of the corresponding content data by changing the sequence of the thumbnail images displayed in the second viewing area 620.

FIG. 21A shows a state in which content data items are selected as the playback content data and thumbnail images are displayed in the second viewing area 620.

It is assumed that a user performs a long tap operation on one of the thumbnail images displayed in the second viewing area 620 in the state shown in FIG. 21A. In this case, the thumbnail image (thumbnail image "3") on which the long tap operation is performed is transformed into a thumbnail image larger in size than other thumbnail images as shown in FIG. 21B, in order to clarify that the thumbnail image is specified by the user. Thereby, the user may check that it is recognized by the information terminal 200 that the thumbnail image (thumbnail image "3") is specified.

The user may move the specified thumbnail image leftward or rightward within the second viewing area 620 as shown in FIG. 21C by performing a flick operation on the specified thumbnail image in the state shown in FIG. 21B. Moreover, after the specified thumbnail image is moved to a predetermined position (FIG. 21D) and the user's hand is moved off the display screen 600, the thumbnail image may be displayed at the predetermined position (FIG. 21E). Namely, the sequence of the thumbnail images displayed in the second viewing area 620 may be changed. Thereby, the sequence of playback of the corresponding playback content data may also be changed.

In this way, in the information terminal 200 according to this embodiment, the sequence of the thumbnail images displayed in the second viewing area 620 may be changed arbitrarily.

In the above-described embodiment, when a long tap operation is performed on a thumbnail image, the size of the thumbnail image is enlarged, in order to clarify that it is recognized by the information terminal 200 that the thumbnail image is specified. However, the present disclosure is not limited to this embodiment. For example, the above-described embodiment may be modified such that a display mode of the thumbnail image when a long tap operation is performed thereon is changed to another display mode, or a size of the selected thumbnail image is reduced, or a color of the selected thumbnail image is changed to a different color, in order to clarify that it is recognized by the information terminal 200 that the thumbnail image is specified.

Another Embodiment

In the first embodiment described above, the user may perform a sliding operation with respect to the first viewing area 610. The present disclosure is not limited to this embodiment. For example, the information terminal 200 may be configured so that the user may also perform a sliding operation with respect to the second viewing area 620.

In a case in which the second viewing area 620 is arranged so that the thumbnail images are arrayed in one line, the user may perform a sliding operation to move the slider only in the right/left direction. However, in a case in which the second viewing area 620 is arranged so that the thumbnail images are arrayed in two or more lines, the user may perform a sliding operation to move the sliders in the right/left direction and the up/down direction.

Moreover, the information terminal 200 may be configured so that the user may perform a sliding operation with respect to the first viewing area 610 and a sliding operation with respect to the second viewing area 620 independently of each other. Namely, when a sliding operation is performed by the user with respect to the first viewing area 610, only the thumbnail images displayed in the first viewing area 610 are moved. When a sliding operation is performed by the user with respect to the second viewing area 620, only the thumbnail images displayed in the second viewing area 620 are moved. Further, when a sliding operation is performed by the user with respect to the first viewing area 610 and the second viewing area 620, both the thumbnail images displayed in the first and second viewing areas 610 and 620 are moved in the operating direction.

As described in the foregoing, the playback system according to the present invention may improve usability when performing a selecting operation to select a group of content data items as a playback object.

The playback system according to the present invention is not limited to the above-described embodiments, and variations and modifications may be made without departing from the scope of the present invention.

The present application is based upon and claims the benefit of priority of Japanese Patent Application No. 2013-165359, filed on Aug. 8, 2013, the contents of which are incorporated herein by reference in their entirety.

What is claimed is:

1. A playback system, comprising:
a display device; and
an information terminal configured to communicate with the display device, the information terminal including,
a memory storing program instructions and further storing a plurality of content, each content associated with at least one content group of a plurality of content groups, such that each content group is associated with a particular set of content of the plurality of content; and
a processor configured to execute the program instructions to
concurrently display, on a display screen of the information terminal, a first viewing area and a second viewing area, wherein,
the first viewing area is reversibly switched between displaying different sets of identification items associated with different content groups of the plurality of content groups; and
the second viewing area displays, concurrently with the first viewing area reversibly switching between displaying different sets of identification items associated with different content groups of the plurality of content groups, a selected set of identification items in the second viewing area, the selected set of identification items associated with a set of selected content, the selected content being selected from one or more content groups according to a selecting operation performed on one or more identification items displayed in the first viewing area;
the information terminal further configured to
transmit playback control information to the display device based on receiving a user-initiated playback instruction input, the playback control information indicating playback settings,
transmit the selected content corresponding to the selected set of identification items to the display device subsequently to transmitting the playback control information, and
transmit a playback instruction associated with the selected content to the display device based on receiving a notification from the display device indicating that the transmitted selected content has been received and stored at the display device;
the display device further configured to
transmit a verification result information to the information terminal based on receiving the playback instruction and verifying that the selected content is capable of being played back based on the playback control information, and
play back the selected content based on the playback settings indicated in the playback control information, subsequently to transmitting the verification result information; and
the information terminal further configured to display a verification result, on the display screen of the information terminal, based on the verification result information received from the display device.

2. The playback system according to claim 1, wherein concurrently displaying the first viewing area and the second viewing area includes displaying the selected set of identification items in the second viewing area in an arrangement corresponding to a sequence of selection of the selected set of identification items from one or more identification items displayed in the first viewing area.

3. The playback system according to claim 1, wherein,
the processor is further configured to execute the program instructions to store the selected set of identification items into a storage device; and
displaying the selected set of identification items includes,
reading the selected set of identification items from the storage device; and
displaying the selected set of identification items read from the storage device in the second viewing area.

4. The playback system according to claim 1, wherein at least one content, of the plurality of content, is classified into at least one content group of the plurality of content groups based on a user-initiated display instruction.

5. The playback system according to claim 1, wherein the concurrently displaying the first viewing area and the second viewing includes displaying, in the first viewing area, identification items, among a plurality of identification items associated with separate content of the plurality of content, which are moved to be viewed in the first viewing area according to a user-initiated display instruction.

6. A non-transitory computer-readable recording medium storing instructions which, when executed by a processor of an information terminal, cause the processor to perform a process comprising:
concurrently displaying, on a display screen of the information terminal, a first viewing area and a second viewing area, wherein,
the first viewing area is reversibly switched between displaying different sets of identification items associated with different content groups of a plurality of content groups, each content group being associated with a particular set of content of a plurality of content; and
the second viewing area displays, concurrently with the first viewing area reversibly switching between displaying different sets of identification items associated with different content groups of the plurality of content groups, a selected set of identification items in the second viewing area, the selected set of identification items associated with a set of selected content, the selected content being selected from one or more content groups according to a selecting operation performed on one or more identification items displayed in the first viewing area;
transmit playback control information to a display device based on receiving a user-initiated playback instruction input, the playback control information indicating playback settings;
transmit the selected content corresponding to the selected set of identification items to the display device subsequently to transmitting the playback control information;
transmit a playback instruction associated with the selected content to the display device based on receiving a notification from the display device indicating that the transmitted selected content has been received and stored at the display device, such that the display device verifies that the selected content is capable of being played back based on the playback control information; and
display a verification result, on the display screen of the information terminal, based on receiving verification result information from the display device, the verification result information indicating that the display device has verified that the selected content is capable of being played back based on the playback control information.

7. The non-transitory computer-readable recording medium according to claim 6, wherein concurrently displaying the first viewing area and the second viewing area includes displaying the selected set of identification items in the second viewing area in an arrangement corresponding to a sequence of selection of the selected set of identification items from one or more identification items displayed in the first viewing area.

8. The non-transitory computer-readable recording medium according to claim 6, wherein,
the process further includes
storing the selected set of identification items storage device; and
displaying the selected set of identification items includes,
reading the selected set of identification items from the storage device upon starting of execution of the instructions; and
displaying the selected set of identification items read from the storage device in the second viewing area.

9. The non-transitory computer-readable recording medium according to claim 6, wherein at least one content, of the plurality of content, is classified into at least one content group of the plurality of content groups based on a user-initiated display instruction.

10. The non-transitory computer-readable recording medium according to claim 6, wherein the concurrently displaying the first viewing area and the second viewing area includes displaying, in the first viewing area, identification items, among a plurality of identification items associated with separate content of the plurality of content, which are moved to be viewed in the first viewing area according to a user-initiated display instruction.

11. A playback control method, performed by playback system including a display device and an information terminal configured to communicate with the display device, the playback control method comprising:
concurrently displaying, on a display screen of the information terminal, a first viewing area and a second viewing area, wherein,
the first viewing area is reversibly switched between displaying different sets of identification items associated with different content groups of a plurality of content groups, each content group associated with a particular set of content of a plurality of content, and
the second viewing area displays, concurrently with the first viewing area reversibly switching between displaying different sets of identification items associated with different content groups of the plurality of content groups, a selected set of identification items in the second viewing area, the selected set of identification items associated with a set of selected content, the selected content being selected from one or more selected content group according to a selecting operation performed on one or more identification items displayed in the first viewing area;
transmitting playback control information from the information terminal to the display device based on receiving a user-initiated playback instruction input at the information terminal, the playback control information indicating playback settings;
transmitting the selected content corresponding to the selected set of identification items from the information terminal to the display device subsequently to transmitting the playback control information;
transmitting a playback instruction associated with the selected content from the information terminal to the display device based on the information terminal receiving a notification from the display device indicating that the transmitted selected content has been received and stored at the display device;
transmitting a verification result information from the display device to the information terminal based on the display device receiving the playback instruction and verifying that the selected content is capable of being played back based on the playback control information;
playing back the selected content at the display device based on the playback settings indicated in the playback control information, subsequently to the transmitting the verification result information; and
displaying a verification result, on the display screen of the information terminal, based on the verification result information received at the information terminal from the display device.

12. The playback control method according to claim 11, wherein concurrently displaying the first viewing area and the second viewing area includes displaying the selected set of identification items in the second viewing area in an arrangement corresponding to a sequence of selection of the selected set of identification items from one or more identification items displayed in the first viewing area.

13. The playback control method according to claim 11, wherein,
the playback control method further includes storing the selected set of identification items into a storage device; and
displaying the selected set of identification items includes,
reading the selected set of identification items from the storage device; and
displaying the selected set of identification items read from the storage device in the second viewing area.

14. The playback control method according to claim 11, wherein at least one content, of the plurality of content, is classified into at least one content group of the plurality of content groups based on a user-initiated display instruction.

15. The playback control method according to claim 11, wherein the concurrently displaying the first viewing area and the second view area includes displaying, in the first viewing area, identification items, among a plurality of identification items associated with separate content of the plurality of content, which are moved to be viewed in the first viewing area according to a user-initiated display instruction.

16. The playback control method according to claim 11, further comprising:
transmitting the selected content corresponding to the selected set of identification items from the information terminal to the display device.

* * * * *